US010434974B2

(12) United States Patent
Henck et al.

(10) Patent No.: US 10,434,974 B2
(45) Date of Patent: Oct. 8, 2019

(54) HOOD LIFTING ASSEMBLY

(71) Applicant: Joyson Safety Systems Acquisition LLC, Auburn Hills, MI (US)

(72) Inventors: Jeremy Henck, White Lake, MI (US); Larry Wilmot, Oxford, MI (US); Sachidanand Prasad, Peoria, IL (US); Pareed Kumar Jakkamsetti, Troy, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 15/712,334

(22) Filed: Sep. 22, 2017

(65) Prior Publication Data

US 2018/0079385 A1 Mar. 22, 2018

Related U.S. Application Data

(60) Provisional application No. 62/398,275, filed on Sep. 22, 2016.

(51) Int. Cl.
| | |
|---|---|
| *B60R 21/38* | (2011.01) |
| *E05B 77/08* | (2014.01) |
| *F16B 21/09* | (2006.01) |
| *E05B 17/00* | (2006.01) |
| *E05B 81/10* | (2014.01) |

(Continued)

(52) U.S. Cl.
CPC ............. *B60R 21/38* (2013.01); *E05B 77/08* (2013.01); *F16B 21/09* (2013.01); *E05B 17/0062* (2013.01); *E05B 81/10* (2013.01); *E05F 15/50* (2015.01); *E05Y 2900/536* (2013.01); *F16B 1/02* (2013.01); *F16B 43/003* (2013.01)

(58) Field of Classification Search
CPC ...................................................... B60R 21/38
See application file for complete search history.

(56) References Cited

U.S. PATENT DOCUMENTS

| | | | |
|---|---|---|---|
| 6,415,882 | B1 | 7/2002 | Schuster et al. |
| 6,755,268 | B1 | 6/2004 | Polz et al. |

(Continued)

FOREIGN PATENT DOCUMENTS

KR 101241021 3/2013

OTHER PUBLICATIONS

International Search Report and Written Opinion, dated Jan. 4, 2018, in connection with International Application No. PCT/US2017052862.

*Primary Examiner* — James A English
(74) *Attorney, Agent, or Firm* — Meunier Carlin & Curfman LLC

(57) ABSTRACT

A hood lifting assembly according to various implementations includes a re-latching feature that allows two slidably coupled plates to be reset, or locked, relative to each other by moving a head of a pin into a keyhole opening of a keyhole slot defined in one of the plates. In an initial position, the head of the pin is spaced apart from the keyhole opening, allowing the pin to move along the keyhole slot from the initial position to a deployed position and then to a reset position. In other implementations, a hood lifting assembly includes an energy absorbing feature. One exemplary energy absorbing feature includes a plate defining an elongated slot that has a narrowed width portion through which a pin travels during movement from the initial position to the deployed position.

18 Claims, 28 Drawing Sheets

(51) Int. Cl.
   *E05F 15/50* (2015.01)
   *F16B 1/02* (2006.01)
   *F16B 43/00* (2006.01)

(56) References Cited

U.S. PATENT DOCUMENTS

| | | | |
|---|---|---|---|
| 7,296,325 B1* | 11/2007 | Putumbaka | E05D 3/02 |
| | | | 16/348 |
| 7,475,752 B2 | 1/2009 | Borg et al. | |
| 7,540,536 B2 | 6/2009 | Hall | |
| 2005/0279550 A1* | 12/2005 | Saville | B60R 21/38 |
| | | | 180/69.21 |
| 2006/0108169 A1* | 5/2006 | Borg | B60R 21/38 |
| | | | 180/274 |
| 2007/0074919 A1* | 4/2007 | Hirata | B60R 21/34 |
| | | | 180/69.2 |
| 2009/0288271 A1* | 11/2009 | Kmieciak | B60R 21/38 |
| | | | 16/308 |
| 2013/0087401 A1* | 4/2013 | Masih | B60R 21/38 |
| | | | 180/274 |
| 2014/0182962 A1 | 7/2014 | McIntyre, I et al. | |
| 2016/0129950 A1 | 5/2016 | Karjenke et al. | |
| 2016/0245003 A1 | 8/2016 | McIntyre et al. | |
| 2017/0050610 A1* | 2/2017 | Narita | B60R 21/38 |
| 2017/0057458 A1* | 3/2017 | Narita | B62D 25/12 |
| 2017/0136985 A1* | 5/2017 | Narita | B62D 25/10 |
| 2017/0327074 A1* | 11/2017 | Schabenberger | B60R 21/38 |

* cited by examiner

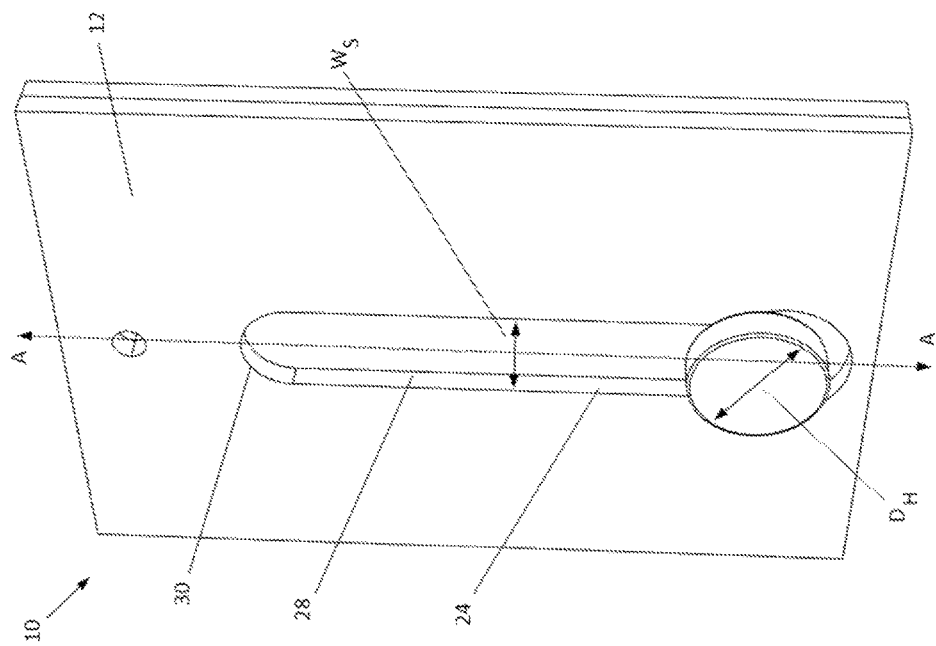

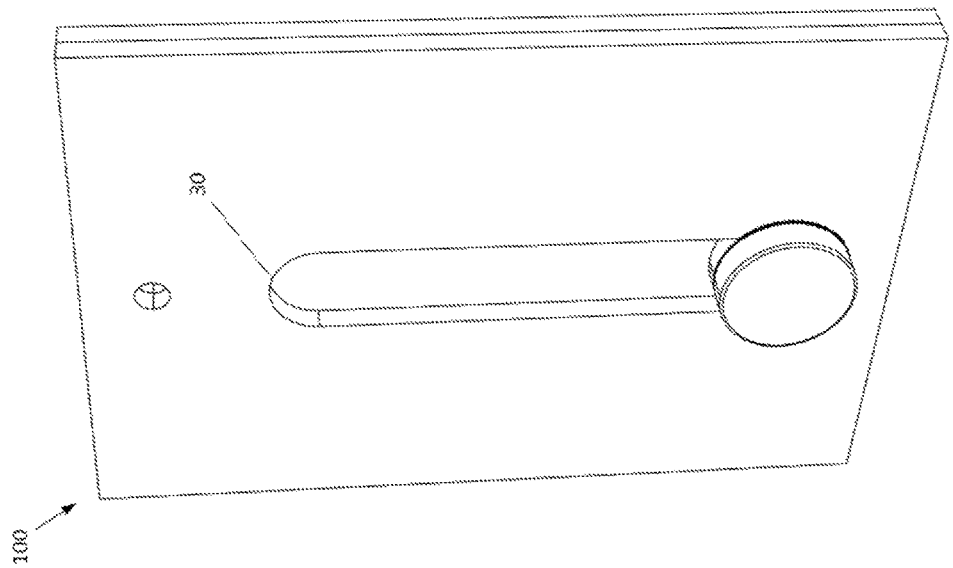

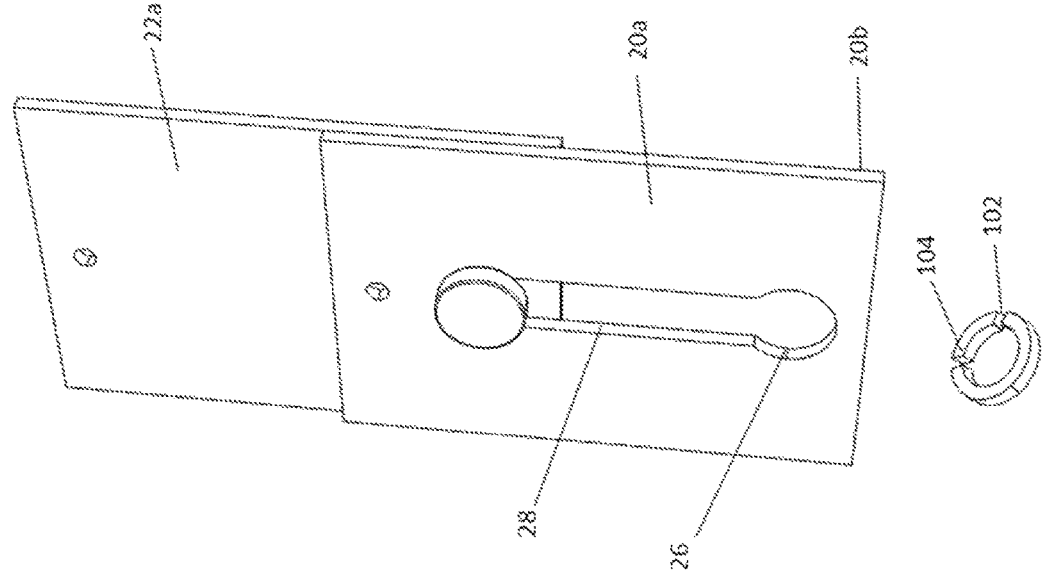

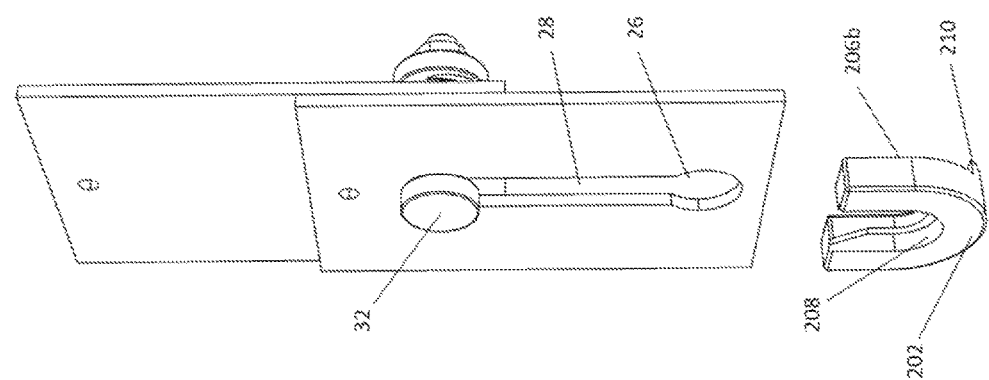

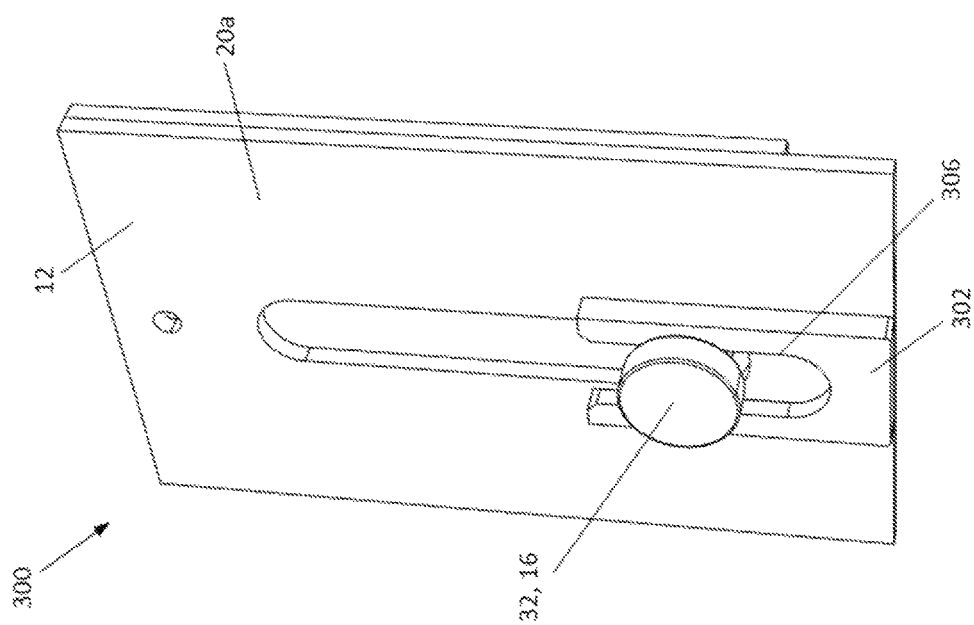

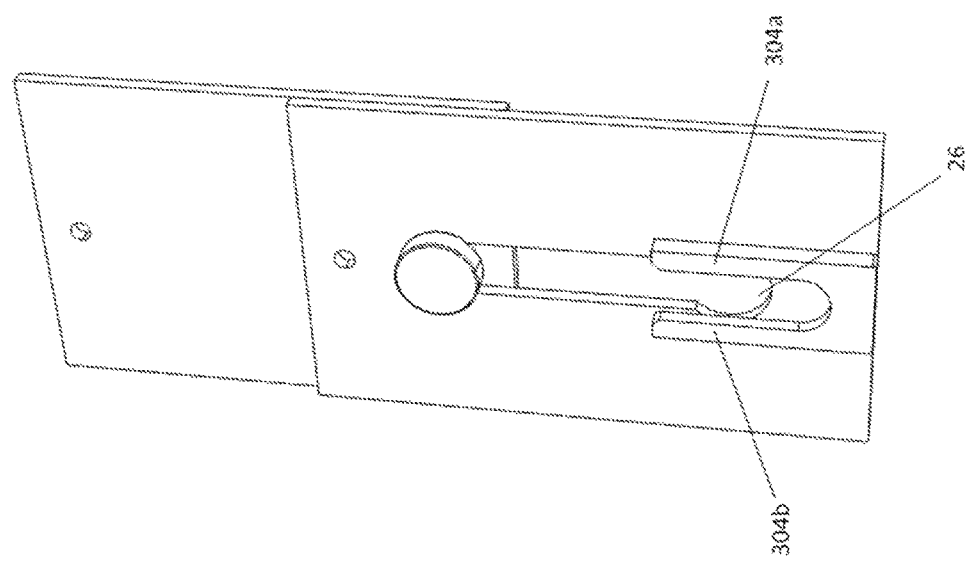

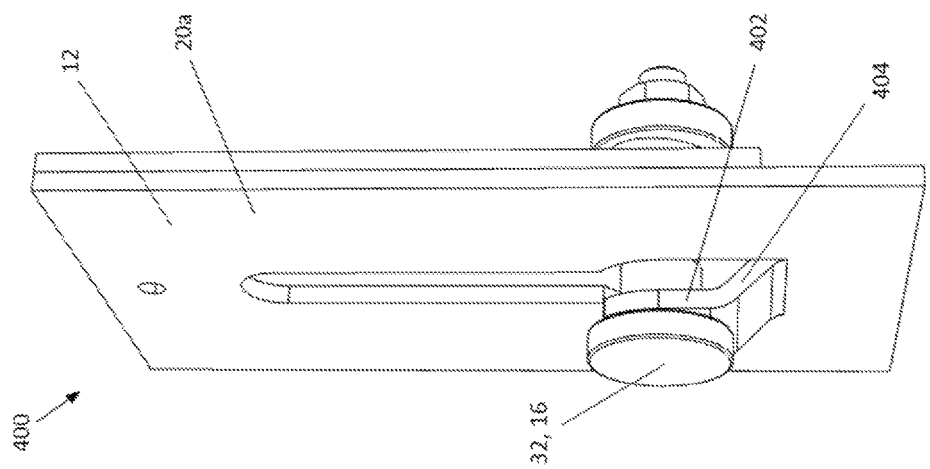

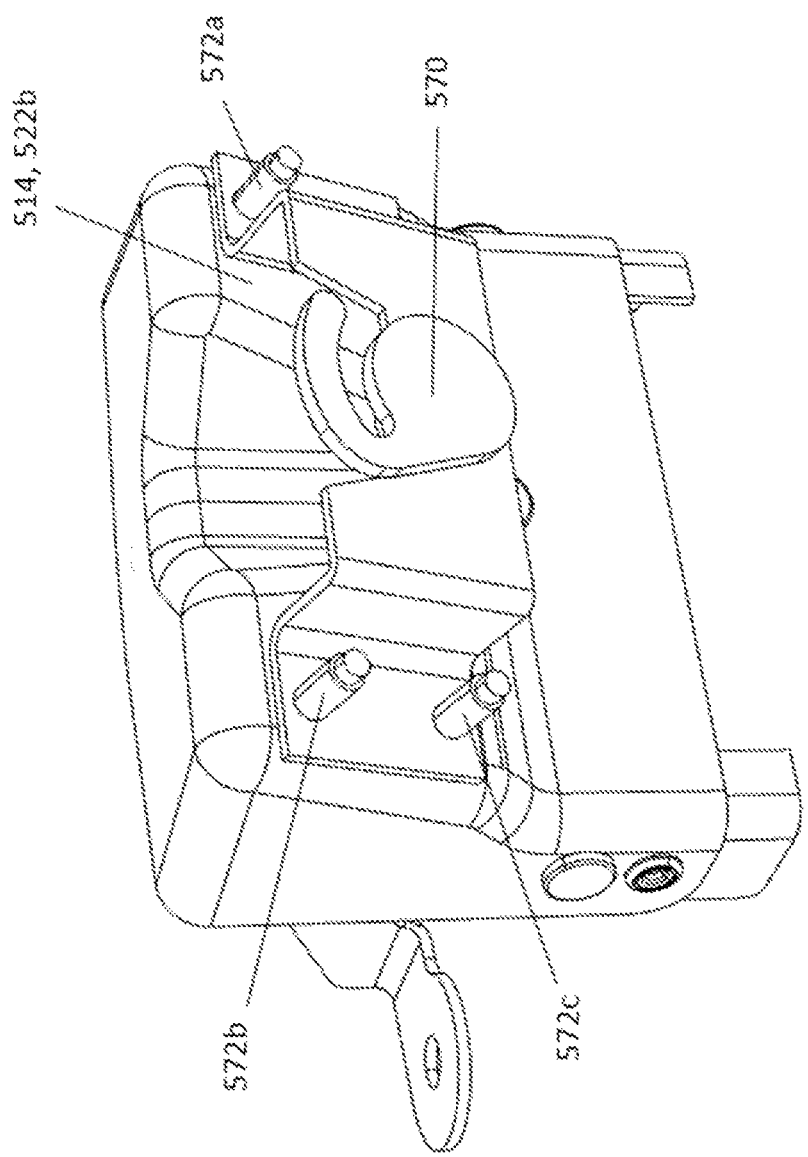

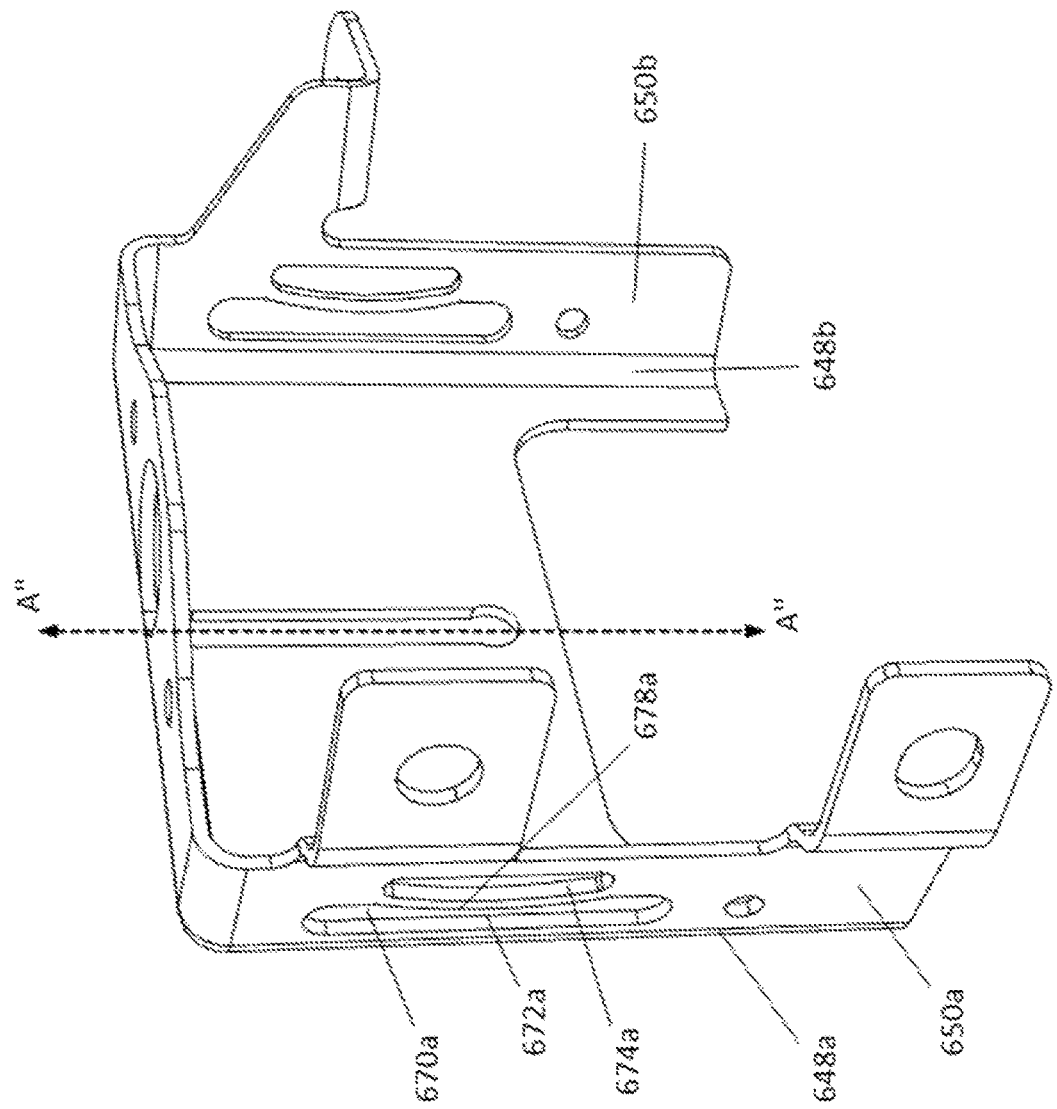

HOOD LIFTING ASSEMBLY

CROSS-REFERENCE TO RELATED APPLICATION

This application claims the benefit of U.S. Provisional Application No. 62/398,275, entitled "Hood Lifting Assembly," filed Sep. 22, 2016, the disclosure of which is incorporated herein by reference in its entirety.

BACKGROUND

To reduce injuries to a pedestrian that has been hit with a vehicle, some vehicles include a front hood lifting assembly to lift the front of the hood away from the frame of the vehicle. The hood lifting assembly typically includes two slidable plates and a hood lifting actuator that pushes one of the plates upward relative to the other plate. The moveable plate is coupled to a portion of the hood latch assembly and transfers the motion of the hood lifting actuator to the hood latch assembly, causing the front of the hood to be moved upwardly. However, it may be necessary to reset the plates in a lowered position for further operation of the vehicle to ensure the hood does not open when the vehicle is driven or towed for repair or service. Current resetting mechanisms are complex. For example, U.S. Patent Application Publication No. 2013/0087401 describes a resetting mechanism.

In addition, some vehicle manufacturers want to control the speed with which the moveable plate is moved upwardly by the hood lifting actuator. Typically, this has been done by riveting extra metal parts onto the hood lifting device to slow down or absorb some of the energy of the hood lifting actuator. The metal parts deform at the end of travel to reduce the impulse of the sudden stop of the actuation and can be steel or aluminum, depending on the amount of energy that the device needs to absorb. However, these parts add cost and manufacturing time to the hood lifting assembly.

Accordingly, an improved hood lifting assembly is needed.

BRIEF SUMMARY

Various implementations include a hood lifting assembly that comprises a first plate, a second plate, at least one pin, and a spring. The first plate has a first surface and a second surface that is opposite and spaced apart from the first surface. The first plate defines at least one keyhole slot, wherein the keyhole slot comprises a keyhole opening and an elongated slot extending from the keyhole opening along an axis. The elongated slot has a proximal end adjacent the keyhole opening and a distal end spaced apart from the keyhole opening along the axis. The second plate has a first surface and a second surface that is opposite and spaced apart from the first surface of the second plate. The at least one pin extends through the second plate along an axis orthogonal to the first and second surfaces of the second plate. The pin comprises a head, a stop surface, and a body extending between the head and the stop surface. The head of the pin has a diameter that is smaller than a diameter of the keyhole opening and larger than a width of the elongated slot. The spring is disposed between the stop surface and the second surface of the second plate and urges the head toward the first surface of the second plate. The pin slidably couples the first and second plates such that the first surface of the second plate faces and is slidably moveable relative to the second surface of the first plate, and the first plate is disposed between the head and the second plate. The second plate is slidable relative to the first plate from an initial position to a deployed position and from the deployed position to a reset position, wherein the head of the pin is spaced apart from the keyhole opening and the body of the pin is disposed through the keyhole slot adjacent a proximal end of the elongated slot in the initial position, the body of the pin is adjacent the distal end of the elongated slot in the deployed position, and the head of the pin is disposed within the keyhole opening in the reset position.

In some implementations, the axis of the pin is spaced apart from a center of the keyhole opening in the initial position such that the head is urged by the spring against the first surface of the first plate adjacent at least a portion of the elongated slot. And, in the reset position, the axis of the pin is aligned with the center of the keyhole opening such that the head is urged into the keyhole opening by the spring.

In some implementations, the hood lifting assembly further comprises a breakable, annular spacer, wherein in the initial position, the annular spacer is disposed around the body of the pin and between the head and the first surface of the second plate within the keyhole opening. The annular spacer has a thickness that is greater than or equal to a thickness of the first plate as measured between the first and second surfaces of the first plate to space the head away from the keyhole opening in the initial position, and the annular spacer breaks as the pin moves from the initial position to the deployed position. In some implementations, the breakable, annular spacer defines a weakened portion.

In other implementations, the hood lifting assembly further comprises a breakable, semi-annular spacer, wherein in the initial position, the semi-annular spacer is disposed around a portion of the body of the pin and between the head and the first surface of the second plate within the keyhole opening. The semi-annular spacer has a thickness that is greater than or equal to a thickness of the first plate as measured between the first and second surfaces of the first plate to space the head away from the keyhole opening in the initial position, and the semi-annular spacer moves out of the keyhole opening as the pin moves from the initial position to the deployed position.

In other implementations, the hood lifting assembly further comprises a spacer defining a U-shaped opening, wherein in the initial position, the U-shaped opening is aligned with the keyhole opening and the elongated slot, the body of the pin extends through the U-shaped opening, and the spacer is at least partially disposed between the head of the pin and the first surface of the first plate. In some implementations, the U-shaped spacer is held between the head and the first surface of the first plate by a biasing force of the spring in the initial position.

In some implementations, the spacer comprises a first surface, a second surface that is opposite and spaced apart from the first surface of the spacer, a seat defined within the U-shaped opening, a first U-shaped inner wall, and a second U-shaped inner wall, wherein at least a portion of the seat lies within a plane that is between and spaced apart from the first surface and the second surface, the first U-shaped inner wall extends between the seat and the first surface, the second U-shaped inner wall extends between the seat and the second surface, a width between opposing faces of the second U-shaped inner wall is less than a width between opposing faces of the first U-shaped inner wall and a diameter of the head of the pin, the width between opposing faces of the first U-shaped wall is greater than the diameter of the head, the second surface of the spacer is disposed adjacent the first surface of the first plate, and the head is engaged with at least a portion of the seat in the initial position. In some implementations, the spacer further comprises a tab extending from the second surface of the spacer in a direction away from the first surface of the spacer. The tab engages a lower surface of the first plate in the initial position.

In some implementations, the spacer comprises resiliently deformable arms that define the U-shaped opening, and the spacer is coupled to the first plate. The resiliently deformable arms are urged away from the keyhole opening by the head during movement from the deployed position to the reset position to allow the head to engage the keyhole opening.

In some implementations, the spacer is coupled to the first plate via a tab extending between the spacer and the first surface of the first plate. The tab extends away from the first surface of the first plate a distance greater than a thickness of the head such that the head is slidable between the spacer and the first plate from the deployed position to the reset position, allowing the head to be disposed within the keyhole opening in the reset position. In some implementations, the tab and the spacer are integrally formed with the first plate.

In some implementations, the hood lifting assembly further comprises two resiliently deformable arms. Each arm has a first end coupled to the first surface of the first plate and a second end. The second ends are spaced apart from each other and disposed adjacent opposite sides of the keyhole opening, wherein in the initial position, the body of the pin extends between the second ends of the arms and through the keyhole slot and the second ends of the arms are disposed between the head and the first plate, and in the reset position, the second ends of the resiliently deformable arms are urged away from the keyhole opening by the head, allowing the head to engage the keyhole opening.

In some implementations, the elongated slot comprises at least one narrowed width portion, the narrowed width portion causing the pin to move more slowly through the narrowed width portion. In some implementations, the narrowed width portion has a first width in the initial position, and the elongated slot adjacent the narrowed width portion has a second width greater than the first width, wherein the pin has a diameter that is less than the second width but greater than the first width, and movement of the pin through the narrowed width portion causes at least one wall of the narrowed width portion to expand outwardly. In some implementations, the first plate defines at least one expansion opening adjacent the narrowed width portion, and an expansion portion of the first plate is defined between the expansion opening and the narrowed width portion of the elongated slot, the expansion portion being urged toward the expansion opening by the pin in response to movement of the pin through the narrowed width portion.

In some implementations, the elongated slot is a first elongated slot and the pin is a first pin, the hood lifting assembly further comprises a first side plate, a second side plate, and a second pin. The first side plate extends from a first side of the first plate at an angle greater than 0°. The second side plate extends from a first side of the second plate at an angle greater than 0°. And, the second pin has a diameter. One of the first or second side plates defines a second elongated slot having an axis that is parallel to the axis of the first elongated slot, and the second pin extends through the other of the second or first side plates and the second elongated slot. The second elongated slot defines a narrowed width portion. The narrowed width portion has a first width in the initial position, and the second elongated slot adjacent the narrowed width portion has a second width greater than the first width. The diameter of the second pin is less than the second width but greater than the first width, and movement of the second pin through the narrowed width portion causes at least one wall of the narrowed width portion to expand outwardly. In some implementations, the side plate defining the second elongated slot defines at least one expansion opening adjacent the narrowed width portion of the second elongated slot, and an expansion portion of the side plate is defined between the expansion opening and the narrowed width portion of the second elongated slot. The expansion portion is urged toward the expansion opening by the second pin in response to movement of the second pin through the narrowed width portion.

In some implementations, the elongated slot is a first elongated slot, the hood lifting assembly further comprises a first side plate, a second side plate, and a shear pin. The first side plate extends from a first side of the first plate at an angle greater than 0°. The second side plate extends from a first side of the second plate at an angle greater than 0°. And, one of the first or second side plates defines a second elongated slot having an axis that is parallel to the axis of the first elongated slot. The shear pin extends through the other of the second or first side plates and the second elongated slot. The shear pin is disposed adjacent a distal end of the second elongated slot in the initial position and is disposed adjacent a proximal end of the second elongated slot during movement of the second plate from the initial position to the deployed position. The shear pin breaks after reaching the proximal end of the second elongated slot, allowing the second plate to continue moving toward the deployed position.

In some implementations, an engagement plate is coupled to the second plate. The engagement plate lies in a plane that is at an angle greater than 0° to the second plate. The engagement plate is disposed adjacent a linear actuator. In some implementations, a hood latch of a vehicle is coupled to the second plate, and the first plate is fixedly coupled to a vehicle frame. In some implementations, the linear actuator comprises a piston assembly that is slidably moveable within a cylinder. The piston assembly pushes the engagement plate away from the first plate to move the second plate from the initial position to the deployed position. In some implementations, the linear actuator is in fluid communication with a gas generator, and the gas generator provides pressurized gas to the cylinder to move the piston assembly within the cylinder.

In various implementations, a hood lifting assembly comprises a first plate, a second plate, and a pin. The first plate has a first surface and a second surface that is opposite and spaced apart from the first surface. The first plate defines at least one elongated slot. The elongated slot has a proximal end, a distal end spaced apart from the proximal end, and an axis extending between the proximal end and the distal end, wherein the elongated slot defines a narrowed width portion. The narrowed width portion has a first width in an initial position, and the elongated slot adjacent the narrowed width portion has a second width greater than the first width. The second plate has a first surface and a second surface that is opposite and spaced apart from the first surface of the second plate. The at least one pin extends through the second plate along an axis orthogonal to the first and second surfaces of the second plate. The pin comprises a first end, a second end, and a body extending between the first and second ends, wherein the first and second ends of the pin have a diameter that is greater than the second width, and the body of the pin has a diameter that is less than the second width and greater than the first width. The pin slidably couples the first and second plates such that the first surface of the second plate faces and is slidably moveable relative to the second surface of the first plate. The movement of the first or second plate relative to each other causes the pin to move through the narrowed width portion, causing at least one wall of the narrowed width portion to expand outwardly.

In some implementations, the first plate further defines at least one expansion opening adjacent the narrowed width portion of the elongated slot, and an expansion portion of the first plate is defined between the expansion opening and the narrowed width portion of the elongated slot, the expansion portion being urged toward the expansion opening by the pin in response to movement of the pin through the narrowed width portion.

In various implementations, a hood lifting assembly comprises a first plate, a second plate, and a shear pin. The first plate has a first surface and a second surface that is opposite and spaced apart from the first surface of the first plate. The second plate has a first surface and a second surface that is opposite and spaced apart from the first surface of the second plate. The second plate defines at least one elongated slot, and the elongated slot has a proximal end, a distal end spaced apart from the proximal end, and an axis extending between the proximal end and the distal end. The at least one shear pin extends through the first plate along an axis orthogonal to the first and second surfaces of the first plate. The shear pin comprises a first end, a second end, and a body extending between the first and second ends. The first and second ends of the shear pin have a diameter that is greater than a width of the elongated slot, and the body of the shear pin has a diameter that is less than the width of the elongated slot. The shear pin slidably couples the first and second plates such that the first surface of the second plate faces and is slidably moveable relative to the second surface of the first plate. And, movement of the second plate relative to the first plate causes the shear pin to engage the proximal end or the distal end of the elongated slot and break.

BRIEF DESCRIPTION OF THE DRAWINGS

Various implementations of the assembly are explained in even greater detail in the following exemplary drawings. The drawings are merely exemplary to illustrate the structure of preferred devices and certain features that may be used singularly or in combination with other features. The invention should not be limited to the implementations shown.

FIGS. 1A-1D illustrate a portion of a hood lifting assembly according to one implementation. FIG. 1A illustrates a perspective view of a portion of the assembly in the initial position as viewed from the first plate. FIG. 1B illustrates a perspective view of the portion of the assembly in the initial position as viewed from the second plate. FIG. 1C illustrates a perspective view of the portion of the assembly in a deployed position. FIG. 1D illustrates a perspective view of the portion of the assembly in a reset position.

FIGS. 2A-2D illustrate a portion of a hood lifting assembly according to another implementation. FIG. 2A illustrates perspective view of the portion of the assembly in the initial position as viewed from the first plate. FIG. 2B is a partial cut-away view of a pin, plates, and spacer of the portion of the assembly shown in FIG. 2A. FIG. 2C illustrates a perspective view of the portion of the assembly of FIG. 2A in the deployed position. FIG. 2D illustrates a perspective view of the portion of the assembly of FIG. 2A in the reset position.

FIGS. 3A-3C illustrate a portion of a hood lifting assembly according to another implementation. FIG. 3A illustrates perspective view of the portion of the assembly in the initial position as viewed from the first plate. FIG. 3B illustrates a perspective view of the portion of the assembly of FIG. 3A in the deployed position. FIG. 3C illustrates a perspective view of the portion of the assembly of FIG. 3A in the reset position.

FIGS. 4A-4D illustrate a portion of a hood lifting assembly according to another implementation. FIG. 4A illustrates a perspective view of the portion of the assembly in the initial position as viewed from the first plate. FIG. 4B illustrates a perspective view of the portion of the assembly of FIG. 4A in the deployed position. FIG. 4C illustrates a perspective view of the portion of the assembly of FIG. 4A as the pin is resetting, and FIG. 4D is a perspective view of the portion of the assembly of FIG. 4A in the reset position.

FIGS. 5A-5C illustrate a portion of a hood lifting assembly according to another implementation. FIG. 5A illustrates perspective view of the portion of the assembly in the initial position as viewed from the first plate. FIG. 5B illustrates a perspective view of the portion of the assembly of FIG. 5A in the deployed position. FIG. 5C illustrates a perspective view of the portion of the assembly of FIG. 5A in the reset position.

FIGS. 6A-6C illustrate a hood lifting assembly according to another implementation. FIG. 6A illustrates a perspective view of the hood lifting assembly as viewed from the first surface of the first plate. FIG. 6B illustrates a perspective view of the second surface of the first plate shown in FIG. 6A. FIG. 6C illustrates a perspective view of the second surface of the second plate shown in FIG. 6A.

FIG. 7A-7B illustrate a hood lifting assembly according to another implementation. FIG. 7A illustrates a perspective view of the hood lifting assembly as viewed from the first surface of the first plate. FIG. 7B illustrates a perspective view of the first surface of the first plate shown in FIG. 7A.

FIG. 8A illustrates a perspective view of the hood lifting assembly as viewed from the first surface of the first plate. FIG. 8B illustrates a perspective view of the first surface of the second plate shown in FIG. 8A.

DETAILED DESCRIPTION

Figure 1B:
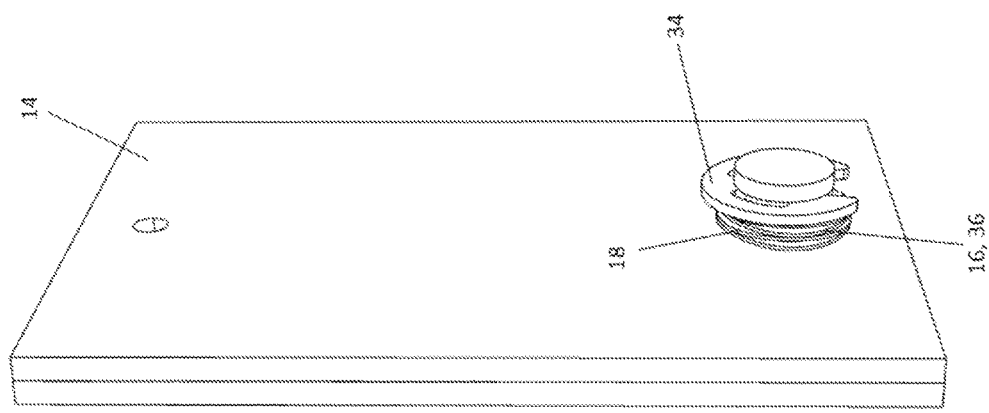

A hood lifting assembly according to various implementations includes two plates that are slidably coupled together by at least one pin. One plate defines a keyhole slot, and the pin extends through the other plate and through the keyhole slot to slidably couple the plates together. In an initial position of the plates, a head of the pin in spaced apart from a keyhole opening of the keyhole slot, allowing the plates to be moved relative to each other. However, in a reset position, the head of the pin engages, or seats, within the keyhole opening, preventing sliding movement of the plates relative to each other. A hood latch assembly coupled to the movable plate is thus movable from the initial position to a deployed position in which the hood is in a raised position above a vehicle frame and from the deployed position to the reset position in which the hood is securely held in a lowered position.

In addition, various implementations of a hood lifting assembly include an energy absorbing feature to reduce the speed of actuation to the deployed position. The hood lifting assembly includes two plates slidably coupled together by at least one pin. One plate defines an elongated slot, and the pin extends through the other plate and through the elongated slot to slidably couple the plates together. In the initial position, the pin is disposed outside of a narrowed width portion of the elongated slot. A diameter of the pin is greater than the narrowed width portion. Thus, when the pin passes through the narrowed width portion, the pin forces the narrowed width portion to expand, which absorbs some of the energy from the hood lifting actuator.

In other various implementations, a hood lifting assembly includes another energy reducing feature that includes an elongated slot defined through one of two plates that are slidably coupled together. A shear pin extends through the other plate and the elongated slot to couple the plates. As the plate with the elongated slot moves relative to the other plate, the shear pin allows movement of the movable plate until an end of the elongated slot contacts the shear pin and breaks the shear pin, which absorbs some of the energy from the hood lifting actuator.

For example, FIGS. 1A-1D illustrate a portion of a hood lifting assembly according to one implementation. As described above, the portion of the assembly 10 shown in FIGS. 1A-1D includes a first plate 12, a second plate 14, a pin 16, and a spring 18. The first plate 12 has a first surface 20a and a second surface 20b that is opposite and spaced apart from the first surface 20a. And, the second plate 14 has a first surface 22a and a second surface 22b that is opposite and spaced apart from the first surface 22a.

The first plate 12 defines at least one keyhole slot 24. The keyhole slot 24 includes a keyhole opening 26 and an elongated slot 28 extending from the keyhole opening 26 along an axis A-A. The elongated slot 28 has a distal end 30 that is spaced apart from the keyhole opening 26 along the axis A-A. The keyhole opening 26 has a diameter of $D_K$, and the elongated slot has a width $W_S$.

The pin 16 includes a head 32, a stop surface 34, and a body 36 extending between the head 32 and the stop surface 34. The second plate 14 defines an opening (not shown), and the body 36 of the pin 16 extends through the opening of the second plate 14 along an axis B-B that is orthogonal to the first 22a and second surfaces 22b of the second plate 14. The opening defined by the second plate 14 has a diameter that is greater than the diameter of the body 36 of the pin 16 but less than a diameter $D_H$ of the head 32 of the pin 16 and of the stop surface 34 of the pin 16, which allows the body 36 of the pin 16 to move axially within the opening but prevents the pin 16 from slipping out of the opening.

Figure 2B:
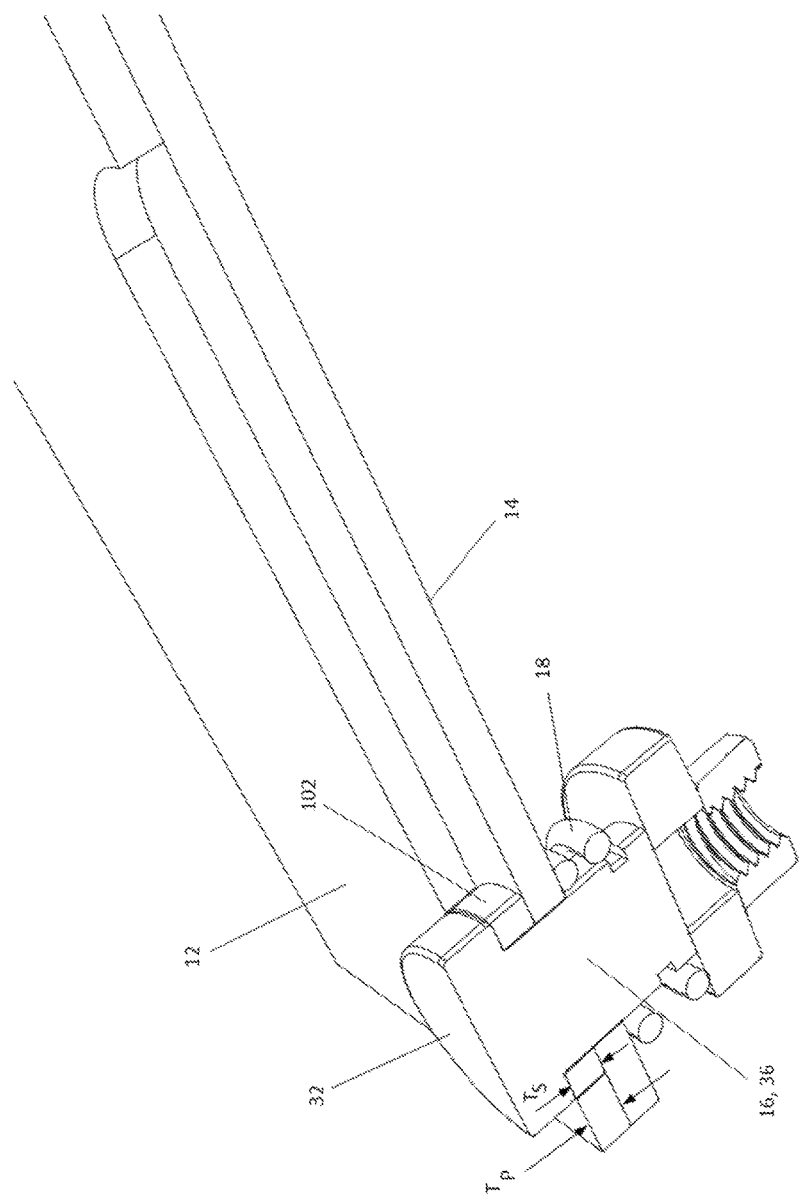
Figure 5B:
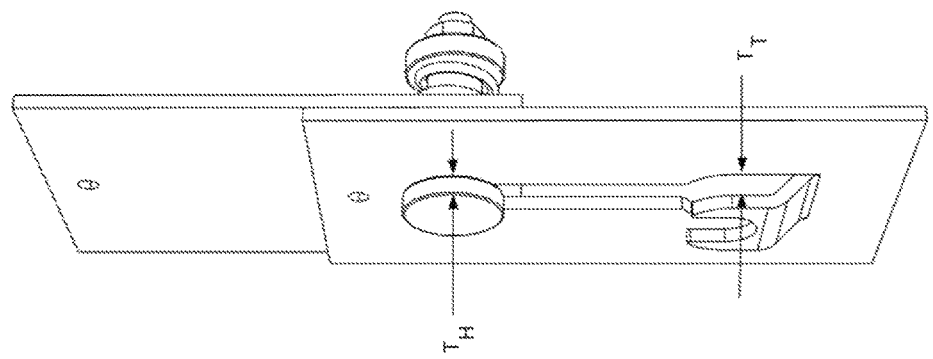
Figure 5C:
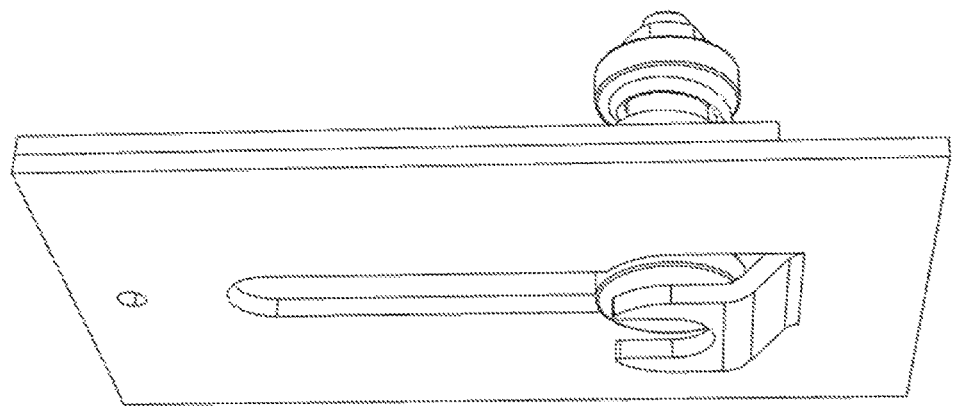

The spring 18 shown in FIG. 1B is a wave spring and is disposed between the second surface 22b of the second plate 14 and the stop surface 34 of the pin 16. The spring 18 urges the head 32 of the pin 16 toward the first surface 20a of the first plate 12. However, in other implementations, other types of springs may be used, such as helical springs, which are shown in FIGS. 2B, 5B, and 5C.

Figure 1C:
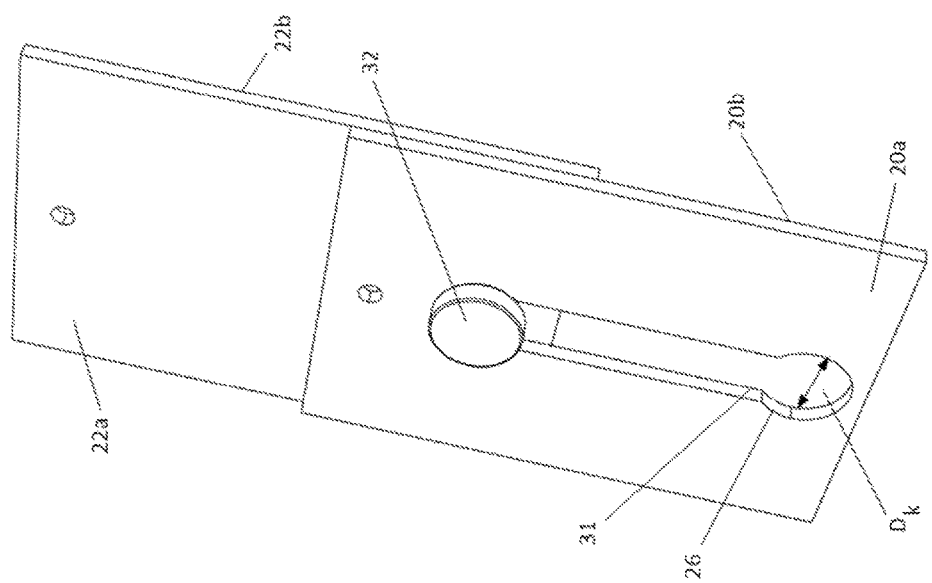
Figure 1D:
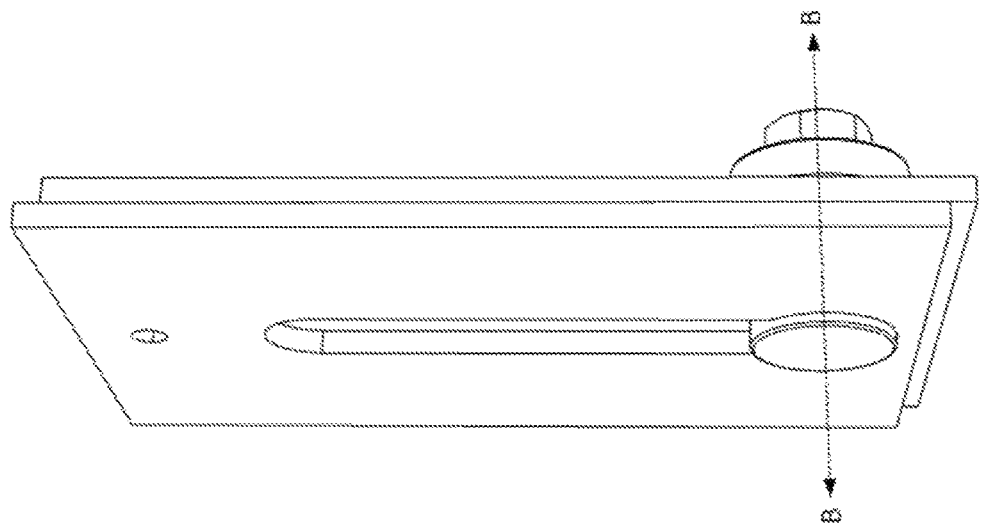

The pin 16 slidably couples the first 12 and second plates 14 such that the first surface 22a of the second plate 14 faces and is slidably movable relative to the second surface 20b of the first plate 12, and the first plate 12 is disposed between the head 32 of the pin 16 and the second plate 14. The second plate 14 is slidable relative to the first plate 12 in the direction of the A-A axis from an initial position, which is shown in FIGS. 1A and 1B, to a deployed position, which is shown in FIG. 1C. In the initial position, the body 36 of the pin 16 is disposed through the keyhole slot 24 adjacent a proximal end 31 of the elongated slot 28 and the head 32 of the pin 16 is spaced apart from the keyhole opening 26 of the keyhole slot 24. Having the head 32 spaced apart from the keyhole opening 26 allows the pin 16 to move through the elongated slot 28 from the initial position to the deployed position. In the deployed position, the body 36 of the pin 16 is adjacent the distal end 30 of the elongated slot 28. In addition, because the diameter $D_H$ of the head 32 of the pin 16 is greater than the width $W_S$ of the elongated slot 28, the head 32 of the pin 16 does not pass through the elongated slot 28.

In the implementation shown in FIGS. 1A-1D, the axis B-B of the pin 16 is offset from a center of the keyhole opening 26 in the initial position to keep the head 32 spaced apart from the keyhole opening 26 prior to deployment. In particular, the head 32 is disposed adjacent at least a portion of the elongated slot 28, and the spring 18 urges the head 32 against the first surface 20a of the first plate 12.

After deployment, the hood may need to be lowered and locked in the lowered position to drive the vehicle or tow it away. To hold the plates in the lowered, or reset, position, the hood is urged downwardly (e.g., by pushing downwardly on the hood), which causes the second plate 14 to slide relative to the first plate 12. The diameter $D_H$ of the head 32 of the pin 16 is less than the diameter $D_K$ of the keyhole opening 26, which allows the head 32 to engage the keyhole opening 26 to reset the assembly 10 when the axis B-B of the pin 16 is aligned with the center of the keyhole opening 26.

FIGS. 2A-2D illustrate another implementation of a portion 100 of an assembly. The portion 100 of the assembly shown in FIGS. 2A-2D is similar to the portion 10 shown in FIGS. 1A-1D except in how the head 32 is spaced apart from the keyhole opening 26 prior to deployment. In particular, in FIGS. 2A-2D, the portion 100 of the assembly includes a breakable, annular spacer 102. The spacer 102 is disposed around the body 36 of the pin 16 and between the head 32 and the first surface 22a of the second plate 14 within the keyhole opening 26 in the initial position. The spacer 102 has a thickness $T_S$ as measured in the direction of axis B-B that is greater than or equal to a thickness $T_P$ of the first plate 12 as measured between the first surface 20a and the second surface 20b of the first plate 12. The axis B-B of the pin 16 is aligned with a center of the keyhole opening 26 in the initial position, but the spacer 102 prevents the head 32 from being urged into the keyhole opening 26 by the spring 18. During movement of the second plate 14 and the pin 16 to the deployed position, the spacer 102 breaks off the pin 16, as shown in FIG. 2C. In some implementations, the spacer 102 has a weakened portion 104 (e.g., a notch) along which the spacer 102 breaks. With the spacer 102 removed from the pin 16, the head 32 of the pin 16 can engage the keyhole opening 26 when the hood is moved downwardly after deployment and into the reset position.

The spacer 102 may be formed of plastic, a low strength metal, or other material that breaks in response to the force of the pin 16 moving toward the distal end 30 of the elongated slot 28.

Figure 10:
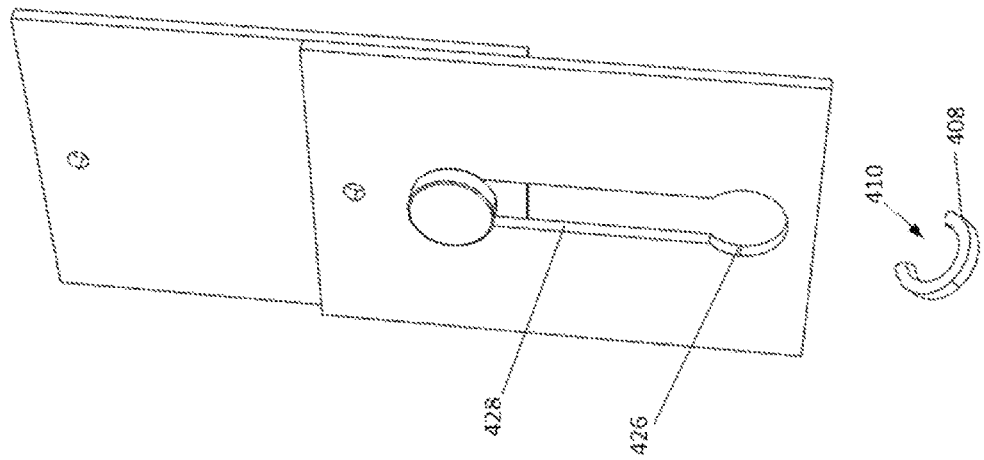
FIG. 10 illustrates a semi-annular spacer according to one implementation.

In other implementations, the spacer may be semi-annular, such as spacer 408 shown in FIG. 10. In the implementation shown in FIG. 10, the semi-annular spacer 408 is disposed within the keyhole opening 426 such that the circumferential space 410 defined by the spacer 408 is not aligned with (e.g., offset or facing away) from the elongated slot 428. Other implementations may include two or more semi-annular portions that fall out of the keyhole opening 426 in response to the force of the pin 16 moving toward the distal end 30 of the elongated slot 428.

Figure 2D:
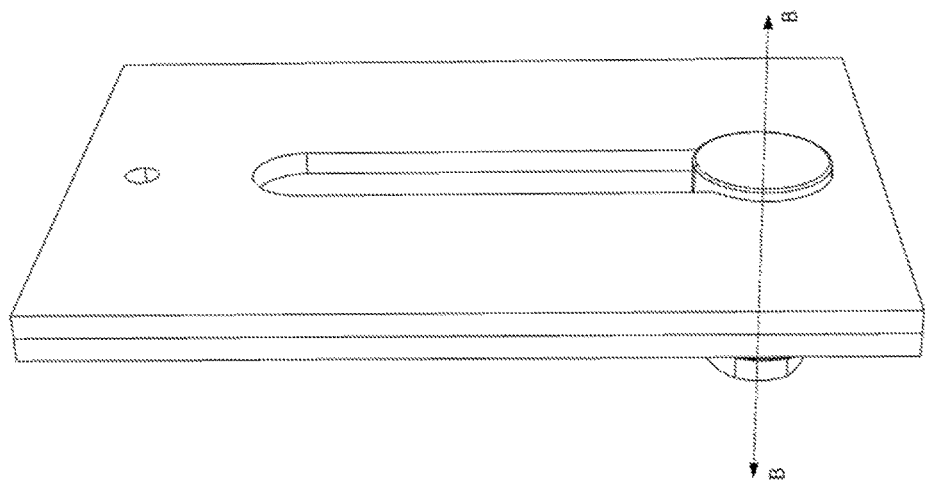
Figure 3A:
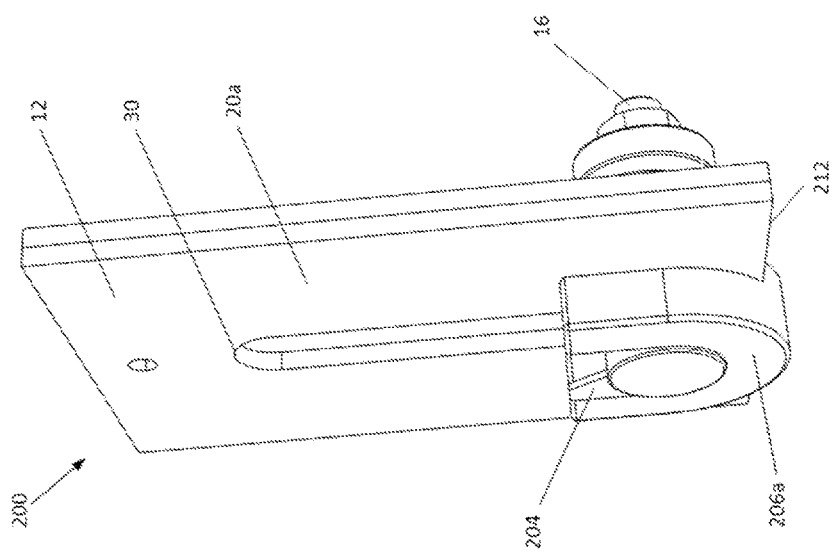
Figure 3C:
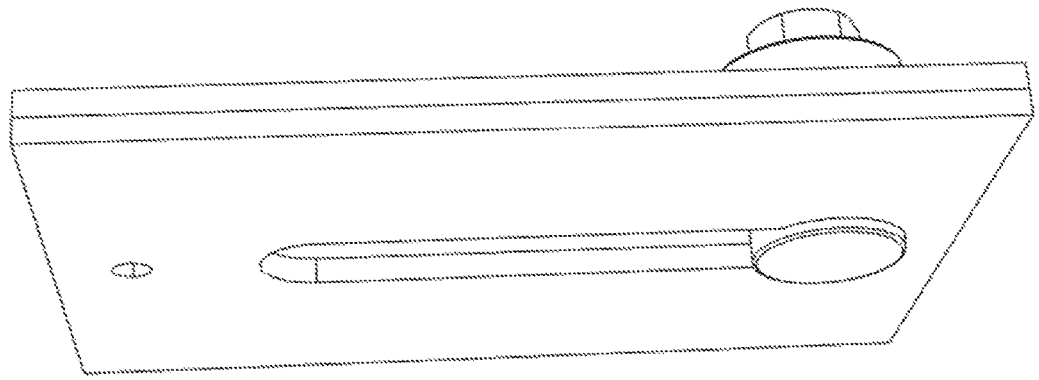

FIGS. 3A-3C illustrate another implementation of a portion 200 of an assembly. The portion 200 of the assembly shown in FIGS. 3A-3C is similar to the portion 100 shown in FIGS. 2A-2D except for the spacer. In particular, the spacer 202 shown in FIGS. 3A-3B defines a U-shaped opening 204. In the initial position, the U-shaped opening 204 is aligned with the keyhole opening 26 and the elongated slot 28, and the body 36 of the pin 16 extends through the U-shaped opening 204. At least a portion of the spacer 202 is disposed between the head 32 of the pin 16 and the first surface 20a of the first plate 12 in the initial position. In the implementation shown in FIGS. 3A-3C, the spacer 202 is held between the head 32 of the pin 16 and the first surface 20a of the first plate 12 by the biasing force of the spring 18. When the pin 16 is moved toward the distal end 30 of the elongated slot 28, the spacer 202 falls away, as shown in FIG. 3B, which allows the head 32 to engage the keyhole opening 26 when the hood is moved downwardly after deployment and into the reset position. FIG. 3C shows the pin in the reset position.

Figure 3D:
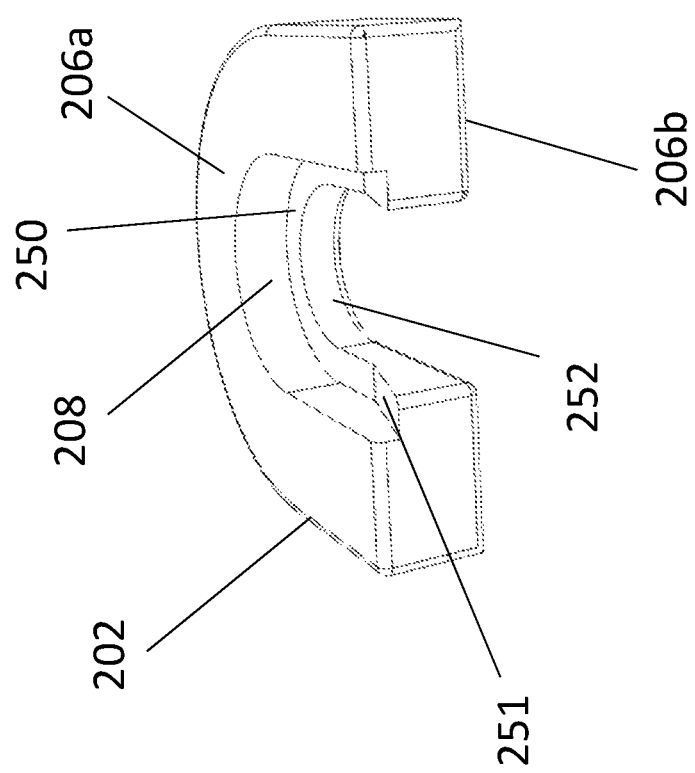
FIG. 3D illustrates a perspective view of the spacer shown in FIGS. 3A and 3B.

The spacer 202 shown in FIGS. 3A-3B and 3D includes a first surface 206a, a second surface 206b that is opposite and spaced apart from the first surface 206a, and a seat 250 defined within the U-shaped opening 204. At least a portion of the seat 250 lies within a plane that is between and spaced apart from the first surface 206a and the second surface 206b. The spacer 202 also includes a first U-shaped inner wall 208 and a second U-shaped inner wall 252. The first and second U-shaped inner walls 208, 252 define the U-shaped opening 204 of spacer 202. The first U-shaped wall 208 extends between the first surface 206a and the seat 250, and the second U-shaped wall 252 extends between the second surface 206b and the seat 250. A width between opposing faces of the second U-shaped inner wall 252 is less than a width between opposing faces of the first U-shaped inner wall 208 and a diameter of the head 32, and the width between opposing faces of the first U-shaped wall 208 is greater than the diameter of the head 32, which allows the head to engage the seat 250 and sit between the opposing faces of the first U-shaped inner wall 208 in the initial position. To prevent the spacer 202 from being inadvertently dislodged from between the head 32 of the pin 16 and the first surface 20a of the first plate 12 due to vibration from the vehicle in which the hood lifting assembly is installed, the spacer 202 further includes a ramp 251 that extends between ends of the seat 250 and ends of the U-shaped spacer 202. The ramp 251 extends toward the first surface 206a such that the ramp 251 is disposed at an angle of greater than 0° with first surface 206a and seat 250. In operation, the actuation force for deploying the pin 16 from the initial position to the deployed position is sufficient for overcoming the additional thickness provided by the ramp 251 (as measured between the ramp 251 and the first surface 20a of the first plate 12), but the vibrational forces expected during normal vehicle operation are not sufficient to move the head 32 over the ramp 251.

The second surface 206b of the spacer 202 is disposed adjacent the first surface 20a of the first plate 12 in the initial position. The spacer 202 further includes a tab 210 that extends from the second surface 206b of the spacer 202 in a direction away from the first surface 206a of the spacer 202. The tab 210 engages a lower surface 212 of the first plate 12 in the initial position. The tab 210 prevents the spacer 202 from moving toward the distal end 30 with pin 16. Although the seat 250 shown in FIG. 2D is U-shaped, in other implementations, the seat may be provided as two separate surfaces that are spaced apart from each other to support circumferentially spaced apart portions of the head 32. And, although the spacer 202 described above includes a ramp 251, other implementations may not include the ramp.

Figure 4C:
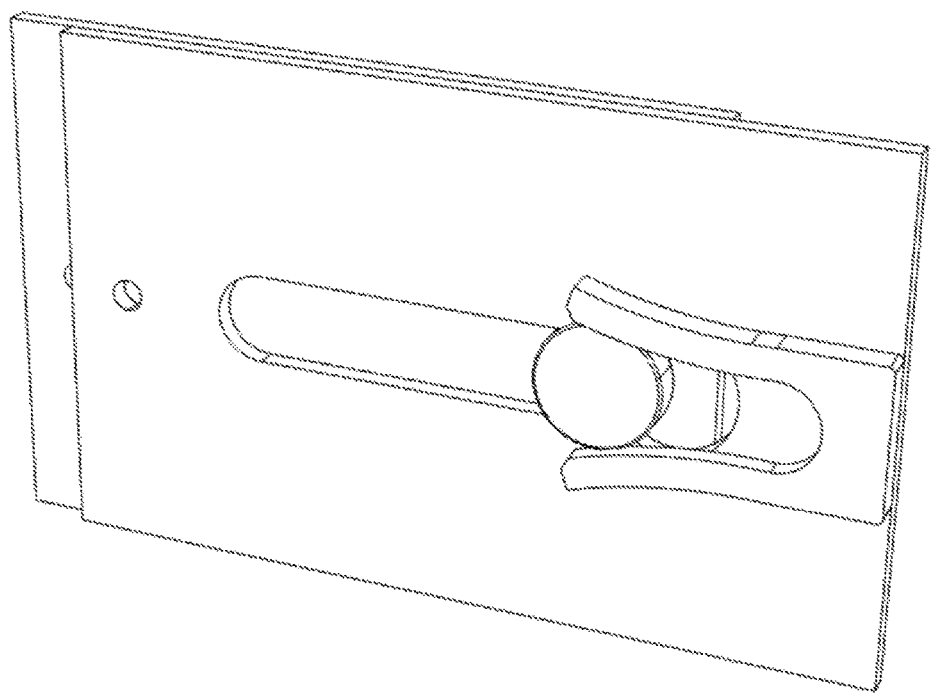
Figure 4D:
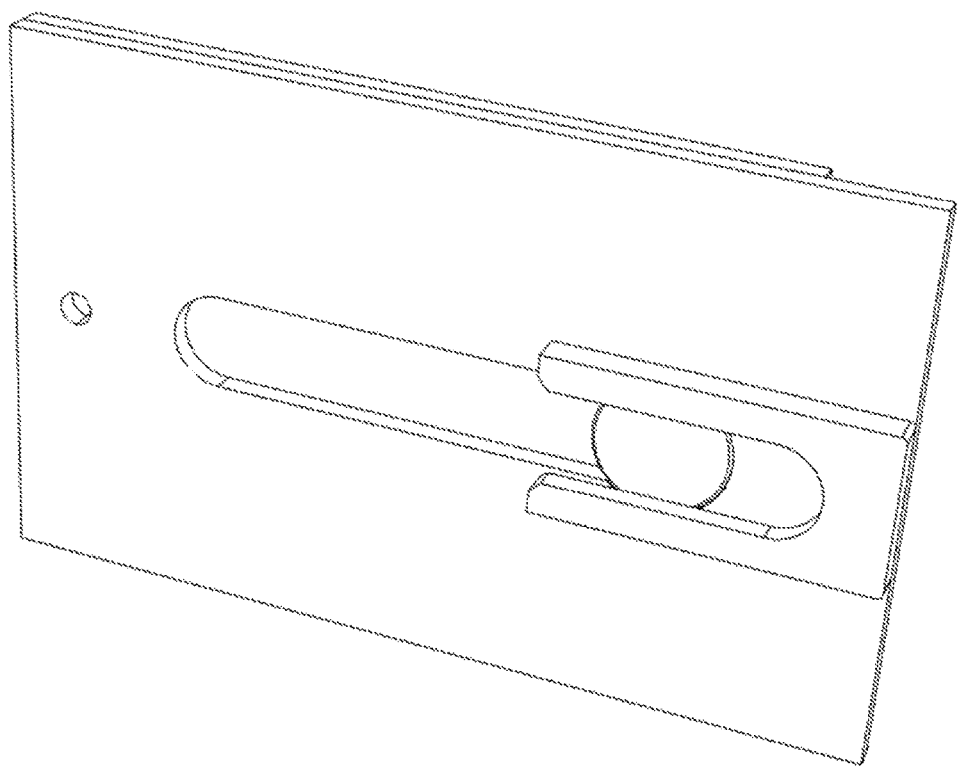

FIGS. 4A-4D illustrate another implementation of a portion 300 of an assembly. The portion 300 of the assembly shown in FIGS. 4A-4D is similar to the portion 200 shown in FIGS. 3A-3C except for the spacer. In particular, the portion 300 includes a spacer 302 that includes resiliently deformable arms 304a, 304b that define a U-shaped opening 306. The spacer 302 is coupled (e.g., fixedly coupled) to the first surface 20a of the first plate 12, and the arms 304a, 304b are disposed adjacent at least a portion of the keyhole opening 26. The arms 304a, 304b are disposed between the head 32 of the pin 16 and the first surface 20a of the first plate 12 in the initial position. In the deployed position, the spring 18 urges the head 32 of the pin against the first surface 20a of the first plate 12. And, when the hood is lowered from the deployed position to the reset position, the head 32, which is adjacent the first surface 20a of the first plate 12, urges the arms 304a, 304b radially outwardly from the circumference of the keyhole opening 26, as shown in FIG. 4C, allowing the head 32 to be urged into the keyhole opening 26 by the spring 18, as shown in FIG. 4D.

FIGS. 5A-5C illustrate another implementation of a portion 400 of an assembly. The portion 400 of the assembly shown in FIGS. 5A-5C is similar to the portions 200, 300 shown in FIGS. 3A-4D except for the spacer. In particular, the portion 400 includes a spacer 402 that is coupled to the first plate 12 via a tab 404 that extends between the spacer 402 and the first plate 12. The tab 404 extends away from the first surface 20a of the first plate 12 a distance $T_T$ that is greater than a thickness $T_H$ of the head 32 of the pin 16, which allows the head 32 of the pin 16 to slide between the spacer 402 and the first plate 12 during movement from the deployed position to the reset position and allows the head 32 to engage the keyhole opening 26 in the reset position. In the implementation shown in FIGS. 5A-5C, the tab 404 and spacer 402 are integrally formed with the first plate 12. However, in other implementations (not shown), the spacer 402 and tab 404 may be separately formed from the first plate 12 and coupled thereto using a fastener.

Figure 6A:
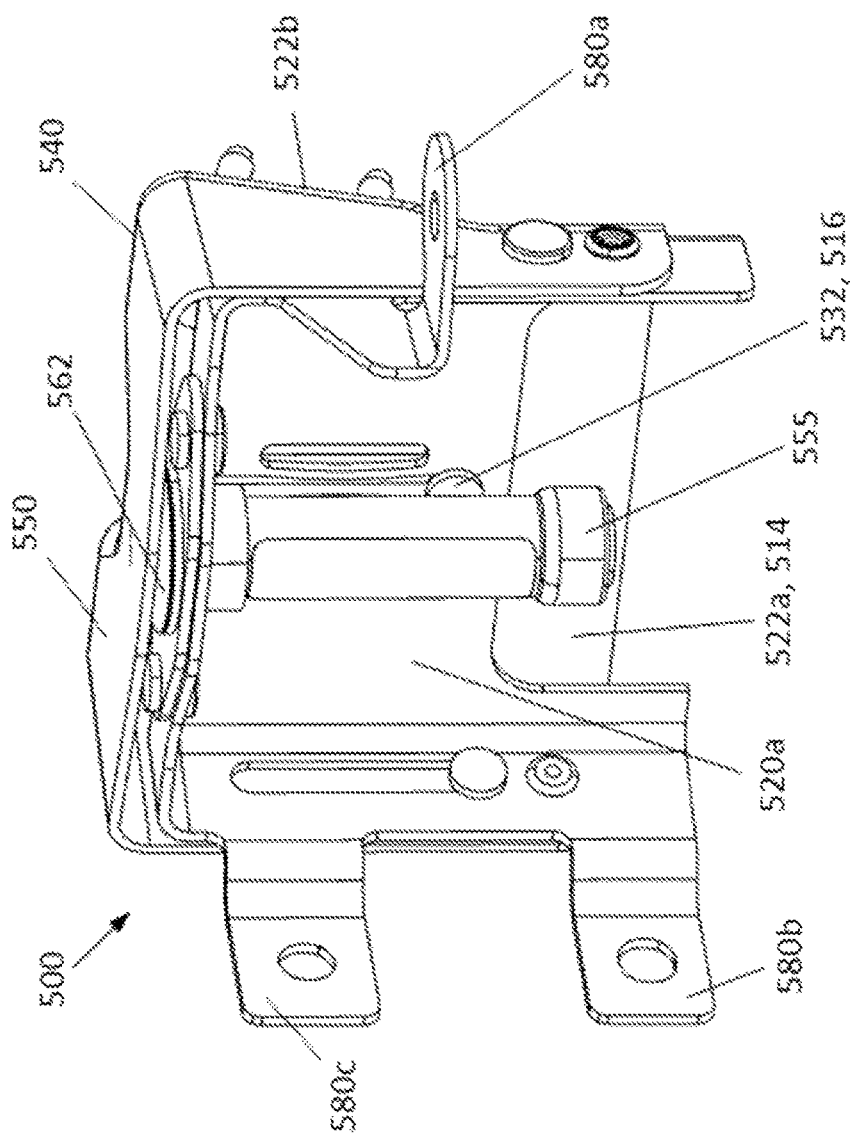
Figure 6B:
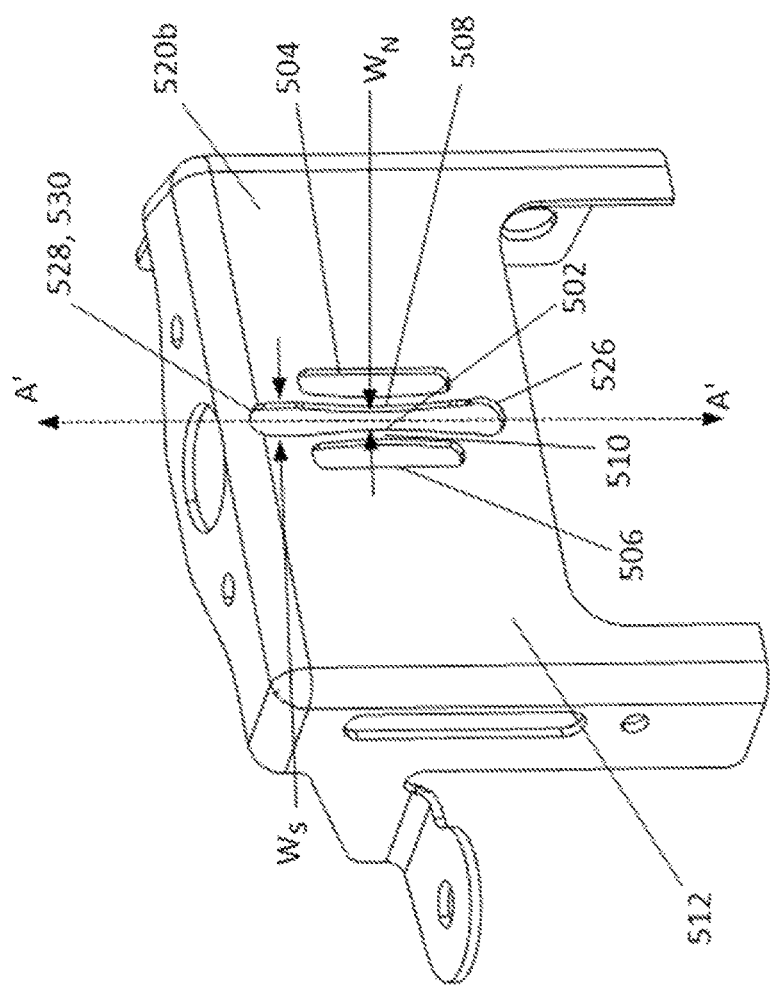

FIGS. 6A-6C illustrate a hood lifting assembly 500 according to one implementation that is similar to the implementations described above in relation to FIGS. 1A-5C, but the assembly 500 further includes an energy absorbing feature. In assembly 500, the elongated slot 528 defined in the first plate 512 defines a narrowed width portion 502. The narrowed width portion 502 is axially spaced apart from the keyhole opening 526 along axis A'-A'. The narrowed width portion 502 has a width $W_N$ that is less than a width $W_S$ of the elongated slot 528 adjacent the narrowed width portion 502. The diameter of the body of the pin 516 is less than the width $W_S$ of the elongated slot 528 but is greater than the width $W_N$ of the narrowed width portion 502.

The first plate 512 also defines a first expansion opening 504 and a second expansion opening 506 adjacent each side of the elongated slot 528. A first expansion portion 508 of the first plate 512 is disposed between first expansion opening 504 and slot 528, and a second expansion portion 510 of the first plate 512 is disposed between the second expansion opening 506 and slot 528. When the pin 516 moves from adjacent the keyhole opening 526 toward the distal end 530 of the elongated slot 528 to the deployed position, the body of the pin 516 urges the narrowed width portion 502 to expand outwardly, urging the expansion portions 508, 510 towards the first expansion opening 504 and second expansion opening 506, respectively. The openings 504, 506 are shown as being elongated in FIGS. 6A-6B, but the openings 504, 506 may be any suitable shape that allows the expansion portions 508, 510 to move in response to the movement of the pin through the slot 528. Thus, the narrowed width portion 502 and the expansion portions 508, 510 resist movement of the pin 516 through the slot 528, and are deformed, which absorbs some of the energy of the pin 516 as the pin 516 moves through the elongated slot 528 toward the distal end 530, reducing the speed at which the second plate 514 moves relative to the first plate 512. By reducing the speed at which the second plate 514 moves relative to the first plate 512, a desired travel time may be achieved and/or a shock of the pulse of the movement may be limited while still retaining the ability to travel the distance set by the vehicle manufacturer. And, the amount of energy to be absorbed by the energy reducing feature may be adjusted by varying the axial length or the width of the narrowed width portion, the number of narrowed width portions, and/or the thickness of the first plate. In some implementations (not shown), the first and second expansion openings may not be defined in the first plate, but the narrowed width portion bends out of the way when the pin is moved through the elongated slot. And, in some implementations such as is described below in relation to FIGS. 7A-7B, there may be one expansion opening adjacent the elongated slot. In other implementations, there may be more than one expansion opening adjacent the elongated slot.

Figure 9:
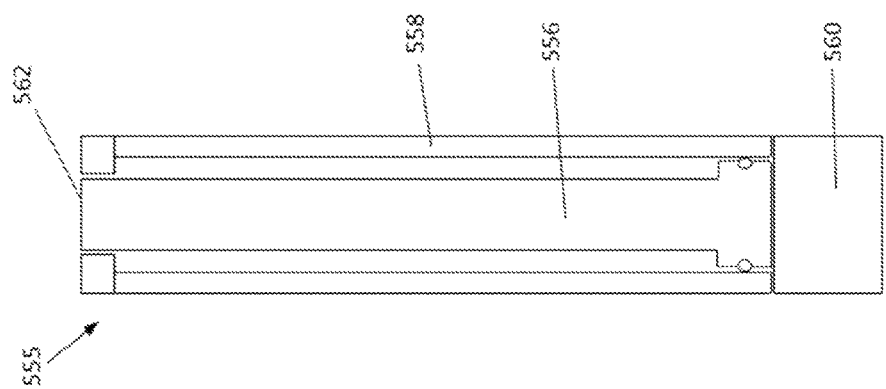
FIG. 9 illustrates a cross sectional view of a linear actuator according to one implementation.

The assembly 500 shown in FIGS. 6A-6C also illustrates an engagement plate 550 that extends from a top edge 540 of the second plate 514. The engagement plate 550 lies in a plane that is at an angle greater than 0° to the second plate 514. The assembly also includes a linear actuator 555 disposed below the engagement plate 550. FIG. 9 illustrates a cross sectional view of an implementation of the linear actuator 555. The linear actuator 555 includes a piston assembly 556 that includes a piston rod and a piston and is slidably mounted within a cylinder 558. The piston and piston rod may be integrally formed or separately formed and coupled together. The linear actuator 555 is in fluid communication with a gas generator 560 (e.g., an initiator or micro gas generator (MGG)), and the gas generator 560 provides pressurized gas to the cylinder 558 to move the piston assembly 556 upwardly within the cylinder 558. Upon actuation of the linear actuator 555, a distal end 562 of the piston assembly 556 engages the engagement plate 550 and pushes the engagement plate 550 and the second plate 514 upwardly into the deployed position. The elongated slot 528 guides the pin 516 coupling the first plate 512 and the second plate 514 through this movement.

The hood latch assembly 570 is coupled to the second surface 522b of the second plate 514, and the first plate 512 is fixedly coupled, directly or indirectly, to the vehicle frame. For example, in the implementation shown in FIGS. 6A-6C, fasteners 572a-572c extend through or from the second plate 514 and a portion of the hood latch assembly 570 to couple the hood latch assembly 570 against the second surface 522b of the second plate 514. In addition, the first plate includes flanges 580a-c for coupling the first plate 512 to the vehicle frame. Movement of the second plate 514 is transferred to the hood latch assembly 570. Thus, the hood latch assembly 570 does not have to be disengaged to move the hood up and down. Although FIGS. 6A-6C show three fasteners for coupling the hood latch assembly 570 to the second plate 514, one or more fasteners may be used in other implementations. In addition, although three flanges 580a-c are shown in FIGS. 6A-6C to couple the first plate 512 to the vehicle frame, one or more flanges or other coupling surfaces may be used in other implementations.

Figure 7A:
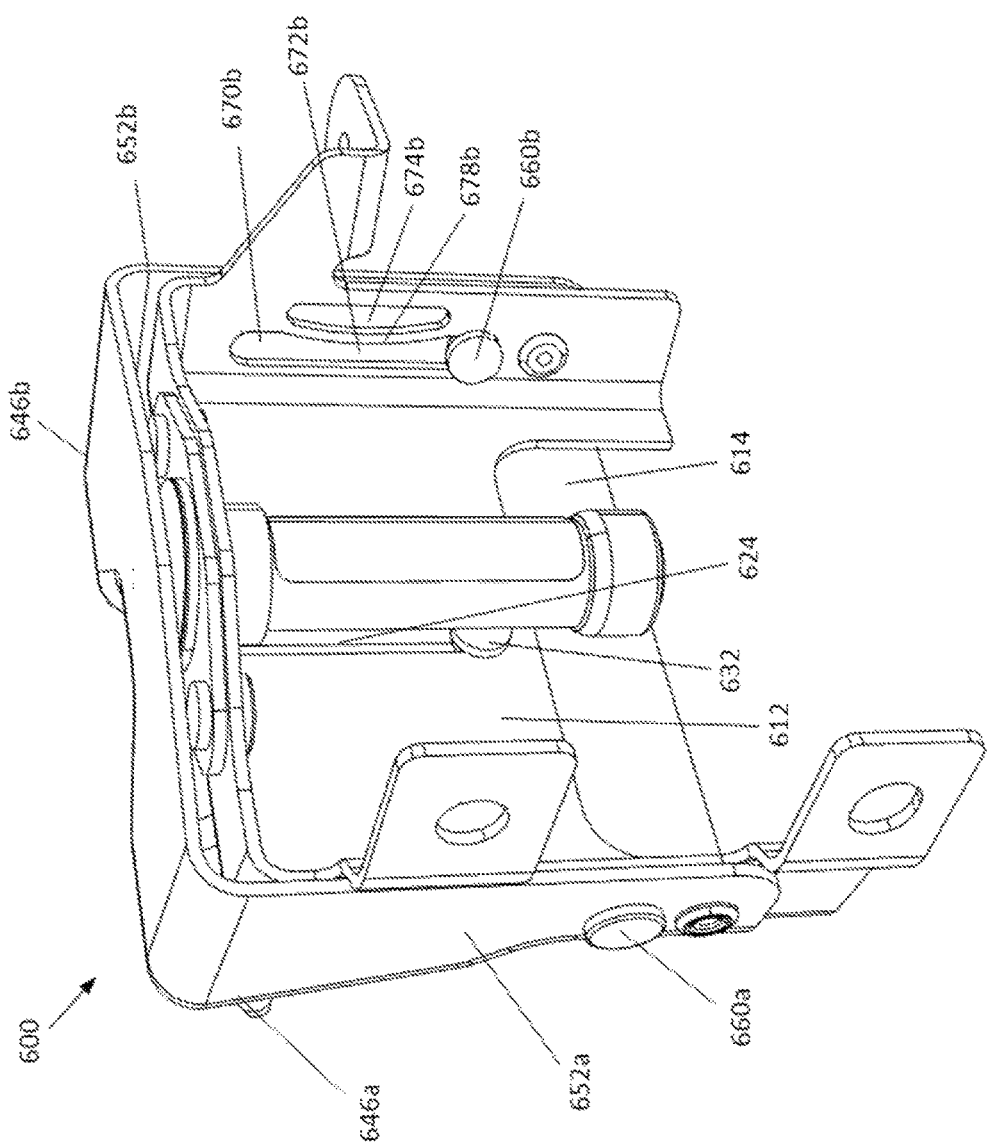

FIGS. 7A-7B illustrate an assembly 600 that is similar to the assembly 500 but the energy absorbing feature is implemented differently. In particular, the assembly 600 includes first and second side plates 650a, 650b that extend from each side edge 648a, 648b, respectively, of the first plate 612. And, first and second side plates 652a, 652b extend from each side edge 646a, 646b, respectively, of the second plate 614. The side plates 650a, 650b, 652a, 652b extend from the first 612 and second plates 614 at an angle greater than 0°.

The first and second side plates 650a, 650b extending from the first plate 612 define elongated slots 670a, 670b, respectively, that extend along an axis parallel to the axis A"-A" extending through the keyhole slot 624. Each elongated slot 670a, 670b includes a narrowed width portion 672a, 672b, respectively, that has a width that is less than a width of the slot 670a, 670b adjacent the narrowed width portion 672a, 672b. Adjacent at least one side of each narrowed width portion 672a, 672b, the side plate 650a, 650b defines an expansion opening 674a, 674b, respectively. And, the side plates 650a, 650b include an expansion portion 678a, 678b disposed between the respective slot 670a, 670b and the respective expansion opening 674a, 674b. Pin 660a extends through the first side plate 652a coupled to the second plate 614 and the elongated slot 670a defined in the first side plate 650a coupled to the first plate 612. And, pin 660b extends through the second side plate 652b coupled to the second plate 614 and the elongated slot 670b defined in the second side plate 650b coupled to the first plate 612. Thus, the narrowed width portions 672a, 672b and the expansion portions 678a, 678b resist movement of the pins 660a, 660b through the slots 670a, 670b, respectively, absorbing some of the energy of the pins 660a, 660b as the pins 660a, 660b move through the slots 670a, 670b toward the deployed position, reducing the speed at which the second plate 614 moves relative to the first plate 612.

In the implementation shown in FIGS. 7A-7B, the keyhole slot 624 does not define a narrowed width portion. However, in other implementations, the keyhole slot 624 may define a narrowed width portion, such as is described above in relation to FIGS. 6A-6B, in addition to the narrowed width portions 672a, 672b shown in FIGS. 7A-7B for additional energy absorption. In addition, in other implementations, the elongated slots may be defined by the side plates extending from the second plate instead of the side plates extending from the first plate.

Figure 8A:
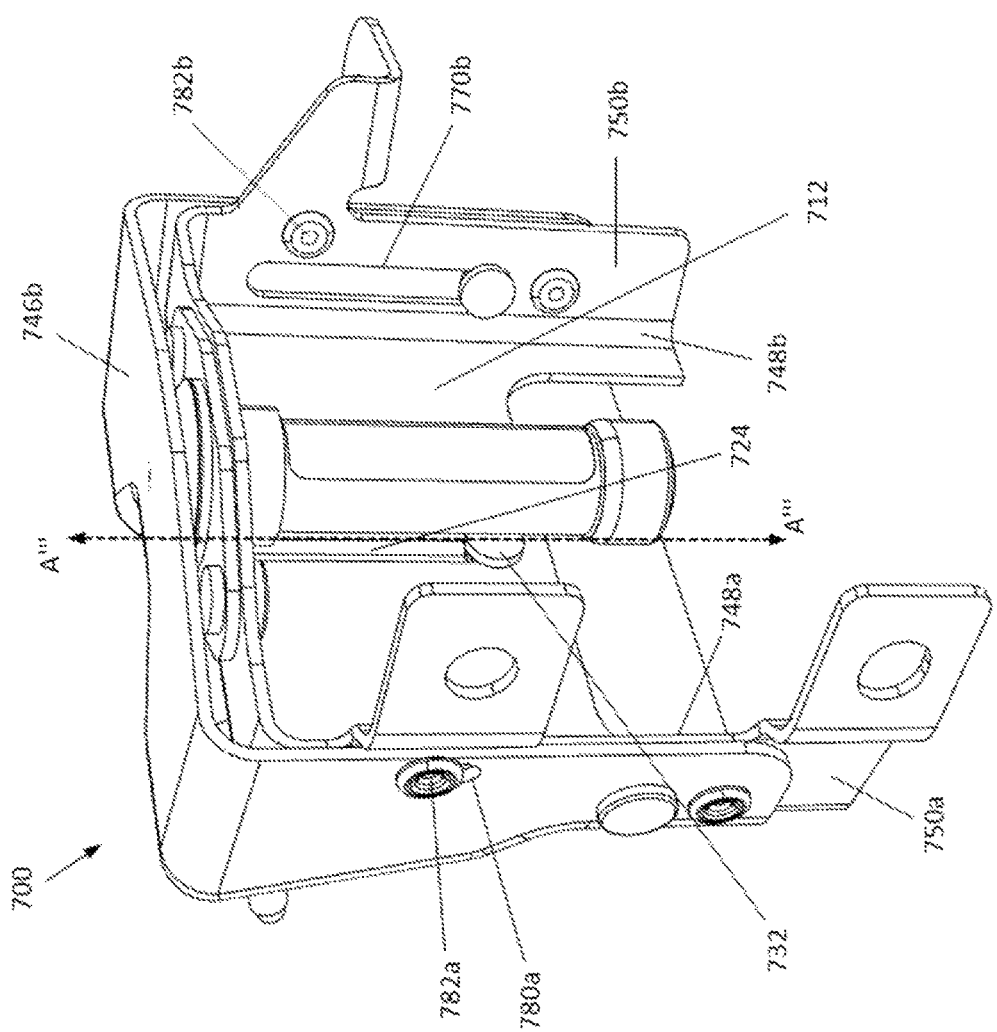
FIG. 8A-8B illustrate a hood lifting assembly according to another implementation.
Figure 8B:
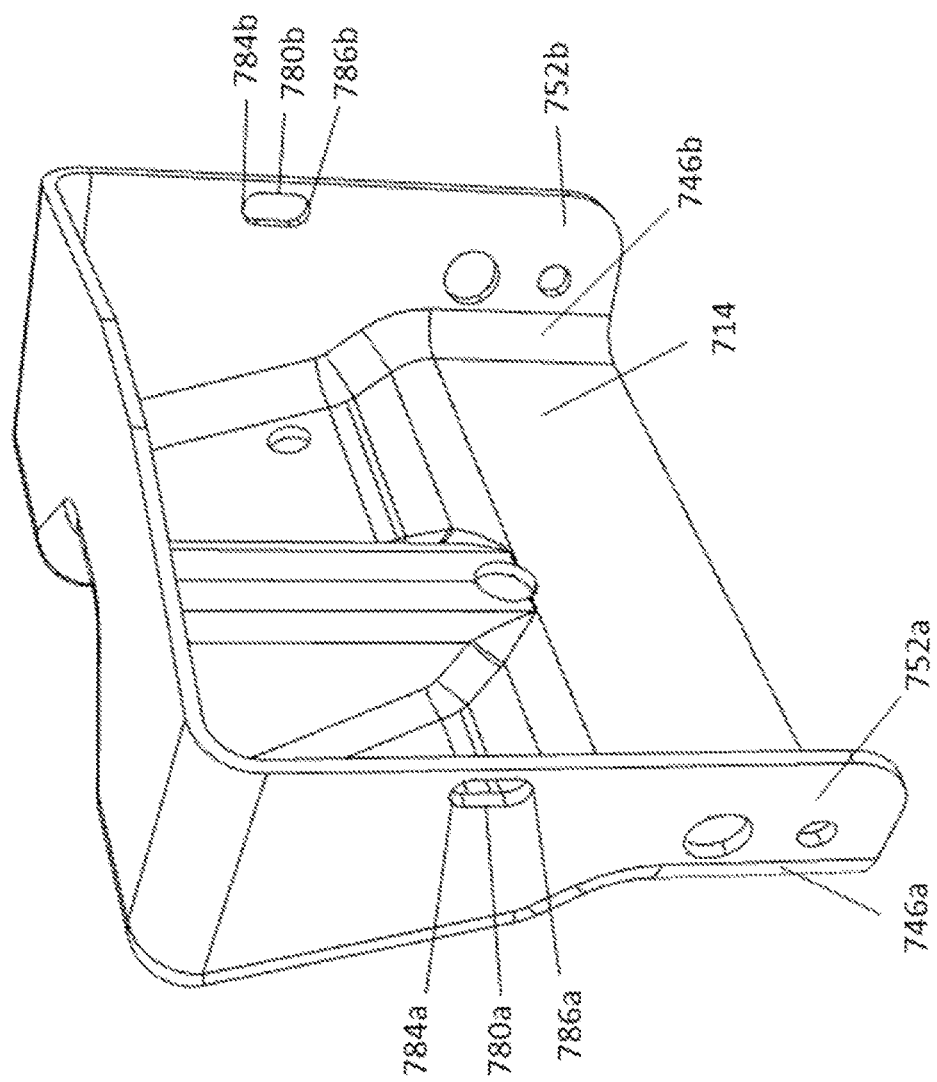

FIGS. 8A-8B illustrate an assembly 700 that is similar to the assemblies 500, 600, but assembly 700 has a different energy absorbing feature than assemblies 500, 600. In particular, the assembly 700 includes first and second side plates 750a, 750b that extend from each side edge 748a, 748b, respectively, of the first plate 712. And, first and second side plates 752a, 752b extend from each side edge 746a, 746b, respectively, of the second plate 714. The side plates 750a, 750b, 752a, 752b extend from the first 712 and second plates 714 at an angle greater than 0°. Each side plate 752a, 752b defines an elongated slot 780a, 780b, respectively, that has a longitudinal axis that is parallel with the axis A'''-A''' of the keyhole slot 724 defined in the first plate 712. A first shear pin 782a is coupled through the elongated slot 780a defined by the first side plate 752a and to the first side plate 750a, and a second shear pin 782b is coupled through the elongated slot 780*b* defined by the second side plate 752*b* and to the second side plate 750*b*. In the initial position, the shear pins 782*a*, 782*b* are disposed adjacent distal ends 784*a*, 784*b* of the slots 780*a*, 780*b*, respectively. And, during movement of the side plates 752*a*, 752*b* to the deployed position, the proximal ends 786*a*, 786*b* of the slots 780*a*, 780*b* move toward the pins 782*a*, 782*b*. When the proximal ends 786*a*, 786*b* reach the pins 782*a*, 782*b*, the pins 782*a*, 782*b* break, absorbing some of the energy from the movement of the second plate 714.

The implementation shown in FIGS. 8A-8B includes a shear pin and corresponding slot on each side plate, but in other implementations, the shear pin and corresponding slot may extend through the first and second plates, and/or there may be more than one shear pin and corresponding slot per hood lifting assembly. Furthermore, in other implementations, the slots for the shear pin may be defined by the side plates extending from the first plate instead of the side plates extending from the second plate.

The energy absorbing features described above in relation to FIGS. 6A-8B reduce manufacturing time and costs. For example, the energy absorbing features described above are implemented by modifying components that may already be a part of the hood lifting assembly. These features also allow the hood latch assembly to travel to the full stroke for each deployment regardless of the aggressiveness of the deployment. For example, the second plate travels through the energy absorbing feature at different speeds at −40° C. and 100° C., but the second plate travels the entire distance. Prior art dampening features dampen the pulse at the end of the stroke, which can result in the second plate being displaced different amounts based on the temperature and the deployment strength.

In various implementations, the selection of the materials and/or dimensions for various parts of the hood lifting assembly (e.g., plates, pins, shear pins, spacers) may be based, at least in part, on the expected forces to be received by the parts (e.g., during actuation, pedestrian impact, and/or reset) and the expected operability of each part. Exemplary materials that may be considered for the plates, pins, shear pins, and spacers may include metal (e.g., aluminum, steel, etc.), plastic (e.g., polymers, cellulosics, polylactic acid, etc.), composite material (e.g., carbon fiber, glass filled nylon, etc.), or a combination thereof.

The terminology used herein is for describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described to best explain the principles of the invention and the practical application, and to enable others of ordinary skill in the art to understand the invention for various implementations with various modifications as are suited to the particular use contemplated.

The invention claimed is:

1. A hood lifting assembly comprising:
 a first plate having a first surface and a second surface that is opposite and spaced apart from the first surface, the first plate defining at least one keyhole slot, wherein the keyhole slot comprises a keyhole opening and an elongated slot extending from the keyhole opening along an axis, the elongated slot having a proximal end adjacent the keyhole opening and a distal end spaced apart from the keyhole opening along the axis;
 a second plate having a first surface and a second surface that is opposite and spaced apart from the first surface of the second plate;
 at least one pin extending through the second plate along an axis orthogonal to the first and second surfaces of the second plate, the pin comprising a head, a stop surface, and a body extending between the head and the stop surface, wherein the head of the pin has a diameter that is smaller than a diameter of the keyhole opening and larger than a width of the elongated slot; and
 a spring disposed between the stop surface and the second surface of the second plate, the spring urging the head toward the first surface of the second plate,
 wherein:
 the pin slidably couples the first and second plates such that the first surface of the second plate faces and is slidably moveable relative to the second surface of the first plate, and the first plate is disposed between the head and the second plate, and
 the second plate is slidable relative to the first plate from an initial position to a deployed position and from the deployed position to a reset position, wherein the head of the pin is spaced apart from the keyhole opening and the body of the pin is disposed through the keyhole slot adjacent a proximal end of the elongated slot in the initial position, the body of the pin is adjacent the distal end of the elongated slot in the deployed position, and the head of the pin is disposed within the keyhole opening in the reset position.

2. The hood lifting assembly of claim 1, wherein the axis of the pin is spaced apart from a center of the keyhole opening in the initial position such that the head is urged by the spring against the first surface of the first plate adjacent at least a portion of the elongated slot, and, in the reset position, the axis of the pin is aligned with the center of the keyhole opening such that the head is urged into the keyhole opening by the spring.

3. The hood lifting assembly of claim 1, further comprising a breakable, annular spacer, wherein in the initial position, the annular spacer is disposed around the body of the pin and between the head and the first surface of the second plate within the keyhole opening, the annular spacer having a thickness that is greater than or equal to a thickness of the first plate as measured between the first and second surfaces of the first plate to space the head away from the keyhole opening in the initial position, and wherein the annular spacer breaks as the pin moves from the initial position to the deployed position.

4. The hood lifting assembly of claim 3, wherein the breakable, annular spacer defines a weakened portion.

5. The hood lifting assembly of claim 1, further comprising a spacer defining a U-shaped opening, wherein in the initial position, the U-shaped opening is aligned with the keyhole opening and the elongated slot, the body of the pin extends through the U-shaped opening, and the spacer is at least partially disposed between the head of the pin and the first surface of the first plate.

6. The hood lifting assembly of claim 5, wherein the spacer is held between the head and the first surface of the first plate by a biasing force of the spring in the initial position.

7. The hood lifting assembly of claim 5, wherein the spacer comprises a first surface, a second surface that is opposite and spaced apart from the first surface of the spacer, a seat defined within the U-shaped opening, a first U-shaped inner wall, and a second U-shaped inner wall, wherein:
    at least a portion of the seat lies within a plane that is between and spaced apart from the first surface and the second surface,
    the first U-shaped inner wall extends between the seat and the first surface,
    the second U-shaped inner wall extends between the seat and the second surface,
    a width between opposing faces of the second U-shaped inner wall is less than a width between opposing faces of the first U-shaped inner wall and a diameter of the head of the pin,
    the width between opposing faces of the first U-shaped wall is greater than the diameter of the head,
    the second surface of the spacer is disposed adjacent the first surface of the first plate, and
    the head is engaged with at least a portion of the seat in the initial position.

8. The hood lifting assembly of claim 5, wherein the spacer comprises resiliently deformable arms that define the U-shaped opening, the spacer is coupled to the first plate, and the resiliently deformable arms are urged away from the keyhole opening by the head during movement from the deployed position to the reset position to allow the head to engage the keyhole opening.

9. The hood lifting assembly of claim 5, wherein the spacer is coupled to the first plate via a tab extending between the spacer and the first surface of the first plate, the tab extending away from the first surface of the first plate a distance greater than a thickness of the head such that the head is slidable between the spacer and the first plate from the deployed position to the reset position, allowing the head to be disposed within the keyhole opening in the reset position.

10. The hood lifting assembly of claim 9, wherein the tab and the spacer are integrally formed with the first plate.

11. The hood lifting assembly of claim 1, further comprising two resiliently deformable arms, each arm having a first end coupled to the first surface of the first plate and a second end, the second ends being spaced apart from each other and disposed adjacent opposite sides of the keyhole opening, wherein in the initial position, the body of the pin extends between the second ends of the arms and through the keyhole slot and the second ends of the arms are disposed between the head and the first plate, and in the reset position, the second ends of the resiliently deformable arms are urged away from the keyhole opening by the head, allowing the head to engage the keyhole opening.

12. The hood lifting assembly of claim 1, wherein the elongated slot comprises at least one narrowed width portion, the narrowed width portion causing the pin to move more slowly through the narrowed width portion.

13. The hood lifting assembly of claim 12, wherein the narrowed width portion has a first width in the initial position, and the elongated slot adjacent the narrowed width portion has a second width greater than the first width, wherein the pin has a diameter that is less than the second width but greater than the first width, and movement of the pin through the narrowed width portion causes at least one wall of the narrowed width portion to expand outwardly.

14. The hood lifting assembly of claim 13, wherein the first plate defines at least one expansion opening adjacent the narrowed width portion, and an expansion portion of the first plate is defined between the expansion opening and the narrowed width portion of the elongated slot, the expansion portion being urged toward the expansion opening by the pin in response to movement of the pin through the narrowed width portion.

15. The hood lifting assembly of claim 1, wherein the elongated slot is a first elongated slot and the pin is a first pin, the hood lifting assembly further comprising:
    a first side plate extending from a first side of the first plate at an angle greater than 0°;
    a second side plate extending from a first side of the second plate at an angle greater than 0°; and
    a second pin having a diameter;
wherein:
    one of the first or second side plates defines a second elongated slot having an axis that is parallel to the axis of the first elongated slot, and the second pin extends through the other of the second or first side plates and the second elongated slot,
    the second elongated slot defines a narrowed width portion, the narrowed width portion has a first width in the initial position, and the second elongated slot adjacent the narrowed width portion has a second width greater than the first width, and
    the diameter of the second pin is less than the second width but greater than the first width, and movement of the second pin through the narrowed width portion causes at least one wall of the narrowed width portion to expand outwardly.

16. The hood lifting assembly of claim 15, wherein the side plate defining the second elongated slot defines at least one expansion opening adjacent the narrowed width portion of the second elongated slot, and an expansion portion of the side plate is defined between the expansion opening and the narrowed width portion of the second elongated slot, the expansion portion being urged toward the expansion opening by the second pin in response to movement of the second pin through the narrowed width portion.

17. The hood lifting assembly of claim 1, wherein the elongated slot is a first elongated slot, the hood lifting assembly further comprising:
    a first side plate extending from a first side of the first plate at an angle greater than 0°;
    a second side plate extending from a first side of the second plate at an angle greater than 0°; and
    a shear pin;
wherein:
    one of the first side plate or second side plate defines a second elongated slot having an axis that is parallel to the axis of the first elongated slot, and the shear pin extends through the other of the first side plate or second side plate and the second elongated slot,
    the shear pin is disposed adjacent a distal end of the second elongated slot in the initial position and is disposed adjacent a proximal end of the second elongated slot during movement of the second plate from the initial position to the deployed position, and the shear pin breaks after reaching the proximal end of the second elongated slot, allowing the second plate to continue moving toward the deployed position.

18. A hood lifting assembly comprising:

a first plate having a first surface and a second surface that is opposite and spaced apart from the first surface of the first plate;

a second plate having a first surface and a second surface that is opposite and spaced apart from the first surface of the second plate, the second plate defining at least one elongated slot, the elongated slot having a proximal end, a distal end spaced apart from the proximal end, and an axis extending between the proximal end and the distal end; and at least one shear pin extending through the first plate along an axis orthogonal to the first and second surfaces of the first plate, the shear pin comprising a first end, a second end, and a body extending between the first and second ends, wherein the first and second ends of the shear pin have a diameter that is greater than a width of the elongated slot, and the body of the shear pin has a diameter that is less than the width of the elongated slot, wherein:

the shear pin slidably couples the first and second plates such that the first surface of the second plate faces and is slidably moveable relative to the second surface of the first plate, and the body of the shear pin breaks in response to contacting the proximal end of the elongated slot when the second plate moves relative to the first plate.

\* \* \* \* \*